United States Patent [19]
Ono et al.

[11] Patent Number: 4,533,626
[45] Date of Patent: Aug. 6, 1985

[54] PHOTOGRAPHIC LIGHT-SENSITIVE MATERIAL WITH 4-(PARANITROPHENYLAZO)NAPHTHOL DYES

[75] Inventors: Shigetoshi Ono; Toru Harada; Hirohisa Suzuki; Mitsugu Tanaka; Shigeru Nakamura, all of Kanagawa, Japan

[73] Assignee: Fuji Photo Film Co., Ltd., Kanagawa, Japan

[21] Appl. No.: 635,085

[22] Filed: Jul. 27, 1984

[30] Foreign Application Priority Data

Jul. 27, 1983 [JP] Japan ................................ 58-137226

[51] Int. Cl.³ .......................... G03C 1/40; G03C 5/54
[52] U.S. Cl. .................................... 430/562; 430/223
[58] Field of Search ................ 430/223, 562, 225, 226

[56] References Cited

U.S. PATENT DOCUMENTS 3,942,987 3/1976 Landholm et al. ................. 430/223
4,273,708 6/1981 Kilminster ........................... 430/223

Primary Examiner—Richard L. Schilling
Attorney, Agent, or Firm—Sughrue, Mion, Zinn, Macpeak, and Seas

[57] ABSTRACT

A silver halide photographic light-sensitive material is described, containing a compound represented by formula (I)

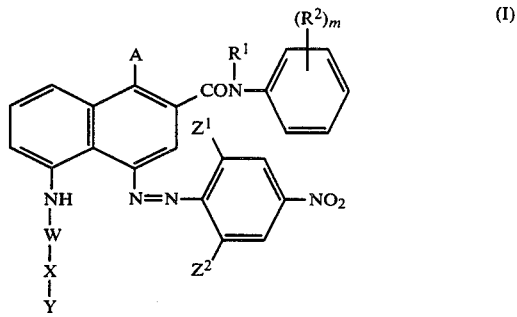

said compound represented by formula (I) being a novel cyan dye-releasing redox compound having various advantages such as providing a high transfer density, a high transfer speed in dye image portions, and high light-fastness.

22 Claims, No Drawings

PHOTOGRAPHIC LIGHT-SENSITIVE MATERIAL WITH 4-(PARANITROPHENYLAZO)NAPHTHOL DYES

FIELD OF THE INVENTION

The present invention relates to a color photographic light-sensitive material. More particularly, it is concerned with a silver halide photographic light-sensitive sheet containing a cyan dye-releasing redox compound which is useful in a color diffusion transfer method.

BACKGROUND OF THE INVENTION

Color photographic light-sensitive materials using various "diffusible dye"-releasing compounds (dye releasers) are known. Typical examples of these diffusible dye-releasing compounds include: p-sulfonamidonaphthol dye releasers, as described, for example, in U.S. Pat. Nos. 3,928,312, 4,076,529, 4,152,153, 4,135,929 and 4,258,120 and Published Application No. B351,673; o-sulfonamidonaphthol dye releasers as described in U.S. Pat. No. 4,053,312; o-sulfonamidophenol dye releasers as described in U.S. Pat. No. 4,055,428, Japanese Patent Application (OPI) Nos. 16130/81, 16131/81 and 12642/81 (the term "OPI" as used herein means an "unexamined published Japanese patent application"); heterocyclic dye releasers as described in U.S. Pat. Nos. 4,179,291 and 4,273,855; and dye releasers as described in U.S. Pat. No. 4,110,113 and West German Pagent Application (OLS) No. 2,534,424. Processes for forming color diffusion transfer image using these compounds as mentioned above are also disclosed in the above-described literature in detail. These compounds are generally referred to as dye-releasing redox (DRR) compounds and are compounds comprising a group referred to as a "redox mother nucleus" and a dye (including a dye precursor) portion linked to the group. Upon exposing the dye-releasing redox compounds in admixture with a light-sensitive silver halide emulsion, and then developing, the redox mother nuclei are oxidized or reduced depending on the amount of silver halide developed. In certain redox compounds, the oxidized product is decomposed into a dye portion containing a diffusible sulfonamido group and a non-diffusible quinone or similar member under attack of an alkaline processing solution. The thus-formed diffusible dye is transferred to an image-receiving layer.

Typical examples of reduction-type redox compounds which release a dye upon reduction are those utilizing an intramolecular nucleophilic reaction.

Examples of redox compounds releasing a cyan dye are described, for example, in Japanese Patent Application (OPI) Nos. 126331/74, 109928/76, 143323/78 and 99431/79. The cyan dye-releasing redox compounds described in the literature, however, have several technical problems; for example, the density of transferred images is insufficient, the transfer speed of the dye portion is low, the stability of the transferred dyes is poor (for example, light-fastness is poor and the discoloration of color images with exposure to light is large), and the density of transferred images considerably changes depending on the processing temperature. Among known compounds, compounds as described in Japanese Patent Application (OPI) No. 99431/79 are relatively good, but are not sufficiently satisfactory.

SUMMARY OF THE INVENTION

An object of the present invention is to provide a novel cyan dye-releasing redox compound and a photographic light-sensitive material containing the redox compound.

Another object of the present invention is to provide a cyan dye-releasing redox compound which gives a high transfer density, and further which is high in the transfer speed of the dye portion, and a photographic light-sensitive material containing the redox compound.

A further object of the present invention is to provide a cyan dye-releasing redox compound of high light-fastness and a photographic light-sensitive material containing the redox compound.

Still another object of the present invention is to provide a compound which is small in a change in the density of transferred images even if the processing temperature is changed.

It has been found that these objects are attained by cyan dye-releasing redox compounds represented by formula (I)

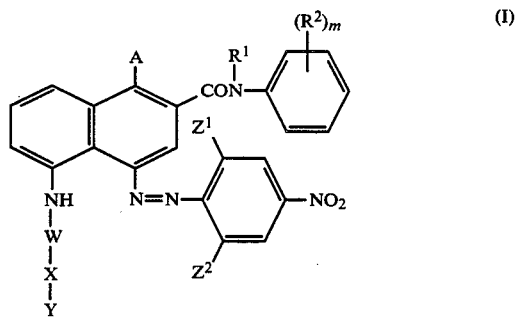

the symbols of which are defined hereinafter.

Thus, the present invention relates to a silver halide photographic light-sensitive material containing a compound represented by formula (I).

In formula (I), $R^1$ is an alkyl group or a substituted alkyl group;

$R^2$ is a sulfonamido group represented by the formula $-NHSO_2R^{2'}$ [wherein $R^{2'}$ may be substituted or unsubstituted and is an alkyl group, an aryl group, a heterocyclic ring, or

(wherein D and D' may be the same or different and are each a hydrogen atom or an alkyl group)], or a sulfamoyl group represented by the formula $-SO_2N-R-R^{2''}$ (wherein $R^{2''}$ is a hydrogen atom, or a substituted or unsubstituted alkyl or aryl group), and may be positioned at any of the ortho-, meta-, and para-positions relative to the

group;

m is an integer of 1 or 2;

W is $-SO_2-$ or $-CO-$;

X is a divalent linking group represented by the formula —$R^3$—$L_n$—$R^{3'}{}_p$— (wherein $R^3$ and $R^{3'}$ may be the same or different, and are each a substituted or unsubstituted alkylene group, a substituted or unsubstituted arylene group, or a substituted or unsubstituted aralkylene group; L is a divalent group selected from an oxy group, a carbonyl group, a carboxyamido group, a carbamoyl group, a sulfonamido group, a sulfamoyl group, a sulfinyl group, and a sulfonyl group; and n and p are each 0 or an integer of 1);

Y is a redox center capable of releasing a diffusible dye on undergoing a self-cleavage as a result of a redox reaction;

$Z^1$ is a halogen atom, a cyano group, a nitro group, a trifluoromethyl group, an alkyl group, an alkoxy group, a carboxyl group, a carboxylic acid ester group represented by the formula —$COOR^4$ (wherein $R^4$ is a substituted or unsubstituted alkyl group, or a substituted or unsubstituted phenyl group), a fluorosulfonyl group, a substituted or unsubstituted phenoxysulfonyl group, a group represented by the formula —$SO_2NR^5R^6$ (wherein $R^5$ is a hydrogen atom, or a substituted or unsubstituted alkyl group, $R^6$ is a hydrogen atom, a substituted or unsubstituted alkyl group, a substituted or unsubstituted aralkyl group, or a substituted or unsubstituted aryl group, and $R^5$ and $R^6$ may be combined together directly or through an oxygen atom, thereby forming a ring), a group represented by the formula —$CONR^5R^6$ (wherein $R^5$ and $R^6$ are the same as defined above), a substituted or unsubstituted alkylsulfonyl group, a substituted or unsubstituted aralkyl group, or a substituted or unsubstituted phenylsulfonyl group;

$Z^2$ is a hydrogen atom, a halogen atom, a nitro group, a cyano group, or a trifluoromethyl group; and A is a hydroxyl group or a group forming a hydroxyl group upon decomposition (representatively, hydrolysis, a combination of hydrolysis and intramolecular nucleophilic reaction as described, for example, in U.S. Pat. No. 4,310,612, or etc.).

DETAILED DESCRIPTION OF THE INVENTION

The cyan dye-releasing redox compounds of the present invention will hereinafter be explained in greater detail.

Preferred examples of the groups represented by $R^1$ include an alkyl group having from 1 to 6 carbon atoms (e.g., methyl, ethyl, n-propyl, and isopropyl), and an alkyl group substituted by, for example, an alkoxyl group and a halogen atom, and having from 1 to 10 carbon atoms (e.g., methoxyethyl, methoxyethoxyethyl, chloroethyl, and hydroxyethyl).

Preferred examples of the groups represented by $R^2$ include an alkanesulfonamido group having from 1 to 6 carbon atoms (e.g., methanesulfonamido and ethanesulfonamido), an unsubstituted sulfamoyl group, and an alkylsulfamoyl group having from 1 to 6 carbon atoms (e.g., methylsulfamoyl and ethylsulfamoyl).

A particularly preferred example of the group represented by W includes —$SO_2$—.

Preferred examples of the groups represented by $R^3$ or $R^{3'}$ in the formula —$R^3$—$L_n$—$R^{3'}{}_p$— include an alkylene group having from 1 to 6 carbon atoms, a substituted alkylene group having from 1 to 10 carbon atoms (substituent examples include an alkoxyl group having from 1 to 3 carbon atoms, a hydroxyl group, a halogen atom, and the like), an arylene group, and a substituted arylene group preferably having from 6 to about 11 carbon atoms [examples of suitable substituents include an alkyl group having from 1 to 4 carbon atoms, an alkoxyl group having from 1 to 3 carbon atoms, an alkoxyalkoxyl group having from 3 to 5 carbon atoms (especially preferably a methoxyethoxy group), a hydroxy group, a halogen atom, a group represented by the formula —$NHSO_2R^7$ (wherein $R^7$ is a substituted or unsubstituted alkyl group having from 1 to 6 carbon atoms, a substituted or unsubstituted phenyl group having from 6 to 10 carbon atoms, or a substituted or unsubstituted aralkyl group having from 7 to 11 carbon atoms), a group represented by the formula —$NHCOR^7$ (wherein $R^7$ is the same as defined above), a group represented by the formula

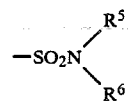

(wherein $R^5$ and $R^6$ are the same as defined above), a group represented by the formula

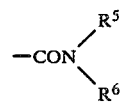

(wherein $R^5$ and $R^6$ are the same as defined above), a cyano group, a group represented by the formula —$SO_2R^7$ (wherein $R^7$ is the same as defined above), a group represented by the formula —$COR^7$ (wherein $R^7$ is the same as defined above), and a group represented by the formula

(wherein $R^8$ and $R^9$ may be the same or different, and are each a hydrogen atom, or a substituted or unsubstituted alkyl group having from 1 to 6 carbon atoms, or an atomic group necessary for forming a 5- or 6-membered heterocyclic ring when $R^8$ and $R^9$ combine together are given, of which a morpholino group is particularly preferred)]. A particularly preferred example of the groups represented by L includes —$SO_2NH$—.

The alkyl group represented by $Z^1$ may be straight or branched and preferably has from 1 to 6 carbon atoms. The alkoxyl group represented by $Z^1$ may be straight or branched and preferably has from 1 to 8 carbon atoms. In the formula —$SO_2NR^5R^6$ represented by $Z^1$, $R^5$ is preferably a hydrogen atom, or a substituted or unsubstituted alkyl group having from 1 to 6 carbon atoms. $R^6$ is preferably a hydrogen atom, an alkyl group having from 1 to 6 carbon atoms, a benzyl group, or a substituted or unsubstituted phenyl group having from 6 to 9 carbon atoms. $R^5$ and $R^6$ may combine together, thereby forming a 5- or 6-membered heterocyclic ring. In the formula —$CONR^5R^6$, $R^5$ and $R^6$ are the same as defined above.

The substituted or unsubstituted alkylsulfonyl group and aralkylsulfonyl group is substituted by the formula —$SO_2R^{10}$, $R^{10}$ is preferably a substituted or unsubstituted alkyl group having from 1 to 6 carbon atoms, or a benzyl group. The $R^4$ of the formula —$COOR^4$ is preferably a substituted or unsubstituted alkyl group having from 1 to 6 carbon atoms and a substituted or unsubstituted phenyl group having from 6 to 10 carbon atoms.

Examples of the substituents for the substituted alkyl group or substituted phenyl group in $R^5$ to $R^{10}$ include a cyano group, an alkoxy group, a hydroxyl group, a carboxyl group, a sulfo group, a sulfamoyl group, a sulfonamido group, and a halogen atom.

The group represented by A, which releases a hydroxyl group upon decomposition, includes, as well as groups which are subject to conventional hydrolysis, groups as described, for example, in U.S. Pat. No. 4,278,750, which are decomposed through an intramolecular cyclization reaction. Of these groups,

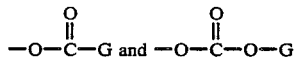

are preferred. In the above formulae, G represents an alkyl group having from 1 to 18 carbon atoms (e.g., a methyl group, an ethyl group, and a propyl group), a halogen-substituted alkyl group having from 1 to 18 carbon atoms (e.g., a chloromethyl group and a trifluoromethyl group), a phenyl group, and a substituted phenyl group.

The group represented by Y will hereinafter be explained in detail.

Among the compounds of formula (I) are non-diffusible image-forming compounds which are oxidized through development and undergo self-cleavage, thereby providing a diffusible dye (i.e., DRR compounds). In compounds of this type, the groups represented by formula (II) as described below can be given as being example groups effective as Y.

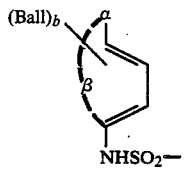
(II)

In formula (II), $\beta$ represents a non-metallic atomic group forming a benzene ring, to which a carbon ring or a hetero ring may be fused, thereby forming, for example, a naphthalene ring, a quinoline ring, a 5,6,7,8-tetrahydronaphthalene ring, or a chroman ring. Moreover, the benzene ring and the rings resulting from condensation of the carbon ring or hetero ring to the benzene ring may be substituted by, for example, a halogen atom, an alkyl group, an alkoxyl group, an aryl group, an aryloxy group, a nitro group, an amino group, an alkylamino group, an arylamino group, an amido group, a cyano group, an alkylmercapto group, a keto group, a carboalkoxy group, and a heterocyclic group.

$\alpha$ represents a group of the formula $-OG^1$ or $-NHG^2$. $G^1$ is a hydrogen atom or a group forming a hydroxyl group on hydrolysis, and preferably is a group of the formula

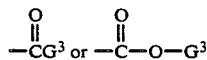

(wherein $G^3$ is an alkyl group, preferably having from 1 to 18 carbon atoms, such as a methyl group, an ethyl group, and a propyl group, a halogen-substituted alkyl group having from 1 to 18 carbon atoms, such as a chloromethyl group and a trifluoromethyl group, a phenyl group, or a substituted phenyl group). $G^2$ is a hydrogen atom, an alkyl group having from 1 to 22 carbon atoms, or a hydrolyzable group. Preferred examples of the hydrolyzable group are

$-SO_2G^5$, and $-SOG^5$ (wherein $G^4$ is an alkyl group having from 1 to 4 carbon atoms, such as a methyl group; a halogen-substituted alkyl group, such as a mono-, di- or trichloromethyl group and a trifluoromethyl group; an alkylcarbonyl group such as an acetyl group; an alkyloxy group; a substituted phenyl group such as a nitrophenyl group and a cyanophenyl group; a phenyloxy group which is substituted by a lower alkyl group or a halogen atom, or is not substituted; a carboxyl group; an alkyloxycarbonyl group; an aryloxycarbonyl group; an alkylsulfonylethoxy group; or an arylsulfonylethoxy group, and $G^5$ is a substituted or unsubstituted alkyl or aryl group).

b is 0 or an integer of 1, or 2. When $\alpha$ is a group of the formula $-OG^1$, or $\alpha$ is a group of the formula $-NHG^2$ and $G^2$ is a hydrogen atom, an alkyl group having from 1 to 8 carbon atoms, or a hydrolyzable group, b is 1 or 2, and preferably 1.

Ball represents a ballast group. The ballast group will be explained later in detail.

Representative examples of Y of the type that is described above are described in U.S. Pat. Nos. 3,928,312, 4,135,929, and Japanese Patent Application (OPI) No. 50736/78.

Other examples of groups which are suitable as Y for the compounds of the type as described above are the groups represented by formula (III).

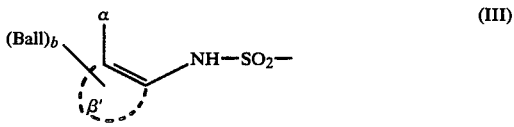
(III)

In formula (III),

Ball, $\alpha$, and b have the same meanings as defined for formula (II), and $\beta'$ is an atomic group forming a carbon ring such as benzene ring, to which a carbon ring or a hetero ring may be fused, thereby forming, for example, a naphthalene ring, a quinoline ring, a 5,6,7,8-tetrahydronaphthalene ring, or a chroman ring. These rings may be further substituted, for example, by a halogen atom, an alkyl group, an alkoxy group, an aryl group, an aryloxy group, a nitro group, an amino group, an alkylamino group, an arylamino group, an amido group, a cyano group, an alkylmercapto group, a keto group, a carboalkoxy group, and a heterocyclic group. Representative examples of Y of this type are described in U.S. Pat. Nos. 4,053,312, 4,055,428, 4,268,625, and Japanese Patent Application (OPI) Nos. 12642/81, 16130/81 and 16131/81. In addition, substituent groups represented by formula (IIIa) as described below are also useful.

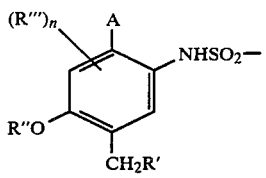

In formula (IIIa), A is the same as defined above, R' is an alkyl group or an aryl group; R" is an alkyl group or an aryl group; R'" is an alkyl group, an alkoxyl group, an alkylthio group, an arylthio group, a halogen atom, or an acylamino group; n is 0, 1 or 2; R" and R'" may combine together to form a condensed ring structure; R' and R" may combine together to form a condensed ring, R' and R'" may combine together to form a condensed ring, and the total number of carbon atoms of R', R" and (R'")$_n$ is more than 7.

Other examples of groups which are suitable as Y for the compounds of the type as described above are the groups represented by formula (IV).

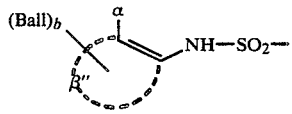

In formula (IV),

Ball, α and b are the same as defined for formula (II), and

β" represents an atomic group forming a hetero ring, such as a pyrazole ring or a pyridine ring. To this hetero ring may be fused a carbon ring or a hetero ring. These rings may be further substituted by groups as described for the substituents in the case of formula (III). Representative examples of Y of this type are described in Japanese Patent Application (OPI) No. 104343/76 (corresponding to U.S. Pat. No. 4,198,235).

Other examples of groups which are suitable as Y for the compounds of the type as described above are the groups represented by formula (V).

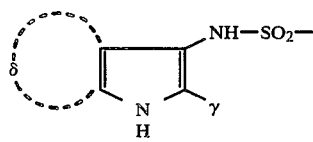

In formula (V),

γ is preferably a hydrogen atom, a substituted or unsubstituted alkyl group, a substituted or unsubstituted aryl group, a substituted or unsubstituted heterocyclic group, or —CO—G$^6$ wherein G$^6$ represents —OG$^7$, —S—G$^7$, or

wherein G$^7$ is a hydrogen atom, an alkyl group, a cycloalkyl group, or an aryl group, and the alkyl, cycloalkyl and aryl groups may be substituted, G$^8$ is the same as defined for G$^7$, or an acyl group derived from an aliphatic or aromatic carboxylic acid or sulfonic acid, and G$^9$ is a hydrogen atom or a substituted or unsubstituted alkyl group;

δ is an atomic group forming a condensed benzene ring which may be substituted by one or more groups; and the substituent of the condensed benzene ring formed by γ and/or δ is a ballast group or a group containing a ballast group. Representative examples of Y of this type are described in Japanese Patent Application (OPI) No. 104343/76, and U.S. Pat. Nos. 4,179,291 and 4,273,855.

Other examples of groups which are suitable as Y for the compounds of the type as described above are groups represented by formula (VI).

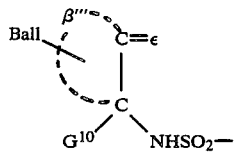

In formula (VI),

Ball is the same as defined for formula (II); and

ε is an oxygen atom or a group =NG" (wherein G" is a hydroxyl group or an amino group which may be substituted). In particular, when ε is =NG", a typical example of G" is the one contained is =C=N—G" which results from a dehydration reaction of a carbonyl reagent represented by H$_2$N—G" and a ketone group. In this case, the compounds of the formula H$_2$N—G" include, for example, hydroxyamino, hydrazines, semicarbazides, and thiosemicarbazides. In more detail, the hydrazines include hydrazine, phenylhydrazine or substituted phenylhydrazine in which the phenyl group is substituted by, for example, an alkyl group, an alkoxyl group, a carboalkoxy group, or a halogen atom, and isonicotinic acid hydrazine; the semicarbazides include phenylsemicarbazide and substituted phenylsemicarbazides containing substituents such as an alkyl group, an alkoxyl group, a carboalkoxyl group, and a halogen atom; and the thiosemicarbazides include various derivatives as in the case of the semicarbazides.

In formula (VI), β'" is a 5-, 6-, or 7-membered saturated or unsaturated non-aromatic hydrocarbon ring. Typical examples of the non-aromatic hydrocarbon ring are cyclopentanone, cyclohexanone, cyclohexenone, cyclopentenone, cycloheptanone, and cycloheptenone.

This 5-, 6-, or 7-membered non-aromatic hydrocarbon ring may be fused to another ring at a suitable position thereof, thereby forming a condensed ring. This other ring may be any desired ring such as an aromatic ring and a non-aromatic ring each including a hydrocarbon ring and a heterocyclic ring. In forming a condensed ring, however, condensed rings resulting from the fusion of benzene and 5- to 7-membered non-aromatic hydrocarbon rings, such as indanone, benzocyclohexenone, and benzocycloheptenone, are more preferred in the present invention.

The 5- to 7-membered non-aromatic hydrocarbon rings and condensed rings as described above may contain one or more of substituents such as an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, and an alkyloxycarbonyl group.

In formula (VI), $G^{10}$ is a hydrogen atom or a halogen atom such as fluorine, chlorine, and bromine. Representative examples of Y of this type are described in U.S. Pat. No. 4,149,892.

In addition, groups as described, for example, in U.S. Pat. Nos. 3,443,939, 3,443,940, 3,443,943, 3,628,952 and 3,844,785 can be given as Y of the compounds of the present invention.

Another type of compounds as represented by formula (I) are non-diffusible image-forming compounds which release a diffusible dye through self-ring closure, for example, under alkaline conditions, but do not substantially cause the dye release when reacted with an oxidized developer (i.e., DRR compounds).

The groups of formula (VII) as described below can be given as examples useful as Y for the compounds of this.

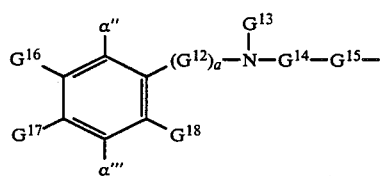

In formula (VII), $\alpha''$ is an oxidizable nucleophilic group, such as a hydroxyl group, a primary or secondary amino group, a hydroxyamino group, and a sulfonamido group, or its precursor, and preferably a hydroxyl group;

$\alpha'''$ is a dialkylamino group or any one of the groups defined for $\alpha''$, and preferably a hydroxyl group;

$G^{14}$ is an electrophilic group, such as —CO— and —CS—, and preferably —CO—;

$G^{15}$ is an oxygen atom, a sulfur atom, a selenium atom, a nitrogen atom, or the like, provided that when it is a nitrogen atom, it may be substituted by a hydrogen atom, an alkyl group or substituted alkyl group having from 1 to 10 carbon atoms, or an aromatic group having from 6 to 20 carbon atoms, and is preferably an oxygen atom;

$G^{12}$ is an alkylene group having from 1 to 3 carbon atoms;

a is 0 or 1, and preferably 0;

$G^{13}$ is a substituted or unsubstituted alkyl group having from 1 to 40 carbon atoms, or a substituted or unsubstituted aryl group having from 6 to 40 carbon atoms, and is preferably an alkyl group; and $G^{16}$, $G^{17}$ and $G^{18}$ are each a hydrogen atom, a halogen atom, a carbonyl group, a sulfamyl group, a sulfonamido group, an alkyloxy group having from 1 to 40 carbon atoms, or any one of the groups defined for $G^{13}$; $G^{16}$ and $G^{17}$ may combine together to form a 5- to 7-membered ring; and $G^{17}$ may be

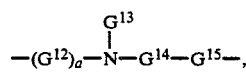

provided that at least one of $G^{13}$, $G^{16}$, $G^{17}$ and $G^{18}$ is a ballast group.

Representative examples of Y of this type are described in U.S. Pat. No. 3,980,479.

Other examples of groups which are suitable as Y for the compounds of the type as described above are the groups represented by formula (VIII).

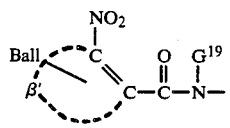

In formula (VIII),

Ball and $\beta'$ are the same as defined for formula (II); and $G^{19}$ is an alkyl group (including a substituted alkyl group).

Representative examples of Y of this type are described in U.S. Pat. Nos. 4,183,753 and 4,142,891.

Other examples of groups which are suitable as Y for the compounds of the type as described above are the groups represented by formula (IX).

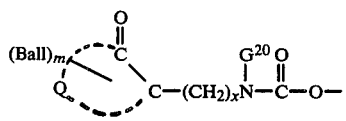

In formula (IX),

Ball is the same as defined for formula (II);

Q is a quinone nucleus (which may be substituted by various groups);

x is an integer of 1 or 2;

$G^{20}$ is an alkyl group or substituted alkyl group having from 1 to about 40 carbon atoms, or an aryl or substituted aryl group having from 6 to 40 carbon atoms; and m is 0 or 1, and when $G^{20}$ is a group having less than 8 carbon atoms, m is 1.

Among the compounds represented by formula (IX) is a group represented by the formula (IXa).

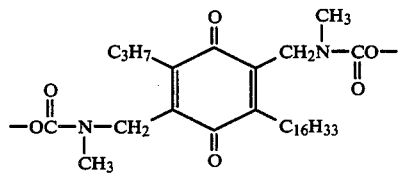

Additional detailed examples are described in U.S. Pat. No. 4,139,379.

Other examples of groups which are suitable as Y for the compounds of the type as described above are the groups represented by formula (X).

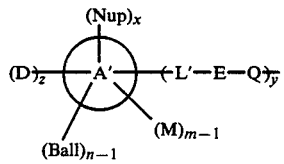

In formula (X), n, x, y and z are each 1 or 2;

m is an integer of 1 or more;

D is an electron donor or a group containing an electron donor precurosr portion;

A' is an organic group connecting Nup to —L'—E—Q— or D;

Nup is a precursor of a nucleophilic group;
E is an electrophilic center;
Q is a divalent group;
Ball is a ballast group;
L' is a connecting group; and
M is any suitable substituent.

Preferred examples of the compounds represented by formula (X) are compounds represented by formula (XI).

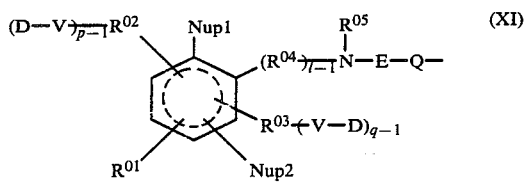

In formula (XI),

Nup1 and Nup2 are each a precursor of a nucleophilic group such as a hydroxyl group, and may be the same or different and preferably are the same, and especially preferably are oxo groups; they may be located at any of o- and p-positions with relative to each other and preferably are located at the p-position; and Nup2 may form a ring (e.g., an aromatic carbon ring, a heterocyclic ring, or a saturated carbon ring) in combination with $R^{01}$ or $R^{03}$;

E is an electrophilic center, specifically a carbonyl group or a thiocarbonyl group, and is preferably a carbonyl group;

Q is a divalent group connecting E to a dye portion, specifically a divalent group, such as an oxygen atom and a sulfur atom, or an imino group (including a substituted imino group, the substituents involving an alkyl group or an aromatic group-substituted alkyl group) and preferably a divalent group of an oxygen atom;

$R^{04}$ is a divalent connecting group, specifically an alkylene group having from 1 to 3 carbon atoms in the connecting main chain (which may be substituted), or a group in which at least one methylene group contained in the connecting main chain is an alkyl- or aryl-substituted methylene group, and preferably a methylene group or an alkyl- or aryl-substituted methylene group;

l is 1 or 2, and is preferably 2;

$R^{05}$ can be an aryl group (including a substituted aryl group) having from 1 to about 40 carbon atoms;

p and q are each 1 or 2, but both of p and q are not 1, and when p or q is 2, $R^{02}$ or $R^{03}$ is any suitable group selected from an alkylene group or substituted alkylene group having from 1 to about 20 carbon atoms, a phenylene group or substituted phenylene group having from 6 to about 20 carbon atoms, and the like, and $R^{02}$ and $R^{03}$ may be the same or different.

In the case of an alkylene group, it may contain in any desired position thereof a divalent connecting group such as a carbamoyl group, a sulfamoyl group, a carboxyamido group, a sulfonamido group, an ether group, a thioether group, and an ester group. $R^{02}$ and $R^{03}$ are preferably alkylene groups having from 1 to about 11 carbon atoms. When p or q is 1, $R^{02}$ or $R^{03}$ is a hydrogen atom, a halogen atom, an alkyl, alkoxy or alkylthio group having from 1 to about 20 carbon atoms, or a phenylene or substituted phenylene group having from 6 to about 20 carbon atoms. The above-described alkyl, alkoxyl, and alkylthio groups may contain a divalent connecting group as described above in any desired point of the alkyl group.

$R^{01}$ may be a one-atom substituent, such as a hydrogen atom and a halogen atom, but is preferably an alkyl, alkoxy or alkylthio group having from 1 to about 40 carbon atoms, or an aryl group having from 6 to about 40 carbon atoms, and may combine with $R^{02}$ to form a ring. In addition, $R^{01}$ may be a group represented by the formula (XIa)

wherein $R^{04}$, l, $R^{05}$, E, and Q are the same as defined above.

At least one or a combination of some of $R^{01}$, $R^{02}$, $R^{03}$, $R^{04}$, and $R^{05}$ may constitute a ballast group. Alternatively, this ballast group may be contained in an electron donor precursor represented by —V—D.

Preferred examples of the electron donor precursor represented by —V—D are groups derived from the compounds represented by formulae (D-I) to (D-III) as described below.

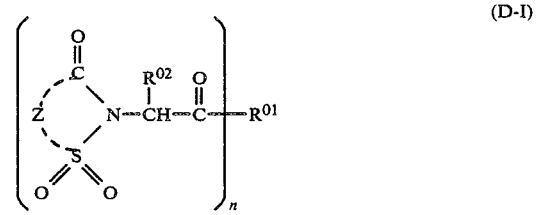

In formula (D-I), Z is an atomic group forming a mono-, bi-, or tricyclic ring, each ring being preferably 5- or 6-membered. The condensed ring constituting the bi- or tricyclic ring can be exemplified by aromatic rings such as a benzene ring and a naphthalene ring. n is 1 or 2; when n is 1, $R^{01}$ is a monovalent aromatic ring (e.g., a benzene ring), and when n is 2, $R^{01}$ is a divalent aromatic ring. $R^{02}$ is any suitable group selected from a hydrogen atom, an alkyl group, an aryl group, an acyl group, an ester group, an amido group, and the like.

In the present invention, the term "alkyl group" is used herein to include a substituted alkyl group and an alicyclic alkyl group unless otherwise indicated. Also, the term "aryl group" is used herein to include a substituted aryl group unless otherwise indicated.

The precursor portion of preferred electron donors has the structure of the following formula (D-Ia).

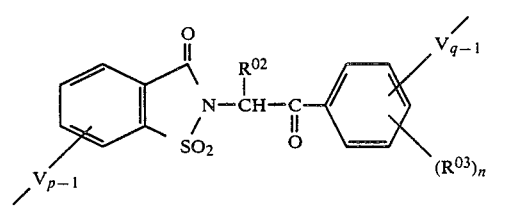

In formula (D-Ia), $R^{02}$ is a hydrogen atom, an alkyl group having from 1 to 30 carbon atoms, or an aryl group having from 6 to 30 carbon atoms, and V is a divalent connecting group, such as a carbamoyl group, a sulfamoyl group, a carboxyamido group, a sulfonamido group, an ether group, a thioether group, and an ester group. These groups for V may be used singly or in combination with each other. These two groups for V may be linked to each other through, for example, an alkylene chain (e.g., $-(CH_2)_m-$, wherein m is an integer of from 2 to 6), or may be linked to each other, thereby forming part of a ring (e.g., a 5- or 6-membered ring). p and q are each 1 or 2; when p is 2, q is 1 and when p is 1, q is 2. $R^{03}$ is any suitable group selected from a hydrogen atom, an alkyl group having from 1 to 30 carbon atoms, an alkyloxy group having from 1 to 30 carbon atoms, a halogen atom, an acylamino group, a sulfonamido group, a cyano group, an acyl group, and the like. n is an integer of from 1 to 3.

The electron donor precursor portion is derived from the compound represented by the formula (D-II).

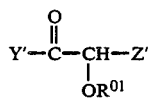 (D-II)

In formula (D-II), $R^{01}$ is an alkali-unstable group (i.e., —OR is decomposed into —OH with alkalis);

Y' is an aliphatic or aromatic group; and

Z' is an electron-attractive group.

The precursor portion of preferred electron donors is represented by formula (D-IIa).

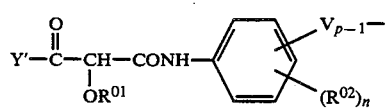 (D-IIa)

In formula (D-IIa), $R^{01}$ is an alkali-unstable group, more specifically an acyl group exemplified by an acetyl group and a benzoyl group;

Y' is an alkyl group having from 1 to 30 carbon atoms, or a phenyl group represented by the formula

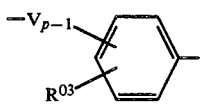

wherein V is a divalent connecting group as described above for formula (D-Ia);

p and q are each 1 or 2; when p is 2, q is 1 and when p is 1, q is 2;

$R^{02}$ and $R^{03}$ are each any suitable group selected from a hydrogen atom, an alkyl group having from 1 to 30 carbon atoms, an alkyloxy group having from 1 to 30 carbon atoms, a halogen atom, an acylamino group, a sulfonamido group, a cyano group, an acyl group, and the like, and may be the same or different; and n is an integer of from 1 to 3.

The precursor portions of the electron donors can also be derived from compounds represented by formula (D-III).

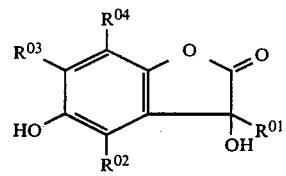 (D-III)

In formula (D-III), $R^{01}$ is an aromatic group or a heterocyclic group; and $R^{02}$, $R^{03}$, and $R^{04}$ may be the same or different, and are each a hydrogen atom, an alkyl group having from 1 to 30 carbon atoms, an alkyloxy group having from 1 to 30 carbon atoms, an aryl group, or an alkylthio group.

The precursor portions of preferred electron donors of formula (D-III) can be represented by formula (D-IIIa).

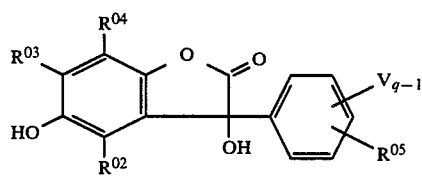 (D-IIIa)

In formula (D-IIIa), $R^{02}$, $R^{03}$ and $R^{04}$ are the same as defined above, provided that when q=1, any one of $R^{02}$, $R^{03}$ and $R^{04}$ can be $(R^{06})_{m-1}V-$;

m is 1 or 2;

$R^{06}$ is an alkylene group having from 1 to 17 carbon atoms, or a phenylene group;

V is a divalent connecting group as described above; and $R^{05}$ is a group such as a hydrogen atom, an alkyl group having from 1 to 30 carbon atoms, an alkyloxy group having from 1 to 30 carbon atoms, an acylamino group, an acyl group, an ester group, a nitro group, a halogen atom, a cyano group, and the like.

For example, groups derived from hydroquinone or its derivatives, aminophenol or its derivatives, ascorbic acids, benzisoxazolones, and the like are effective as the electron donor portion.

The following are given as representative examples of the electron donor precursors that can be used in preferred embodiments of the present invention. In the following formulae, V represents a divalent connecting group as described above for formula (D-Ia).

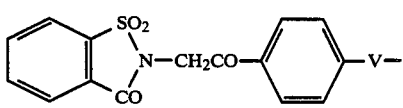 D-1

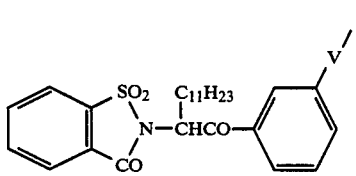 D-2

-continued
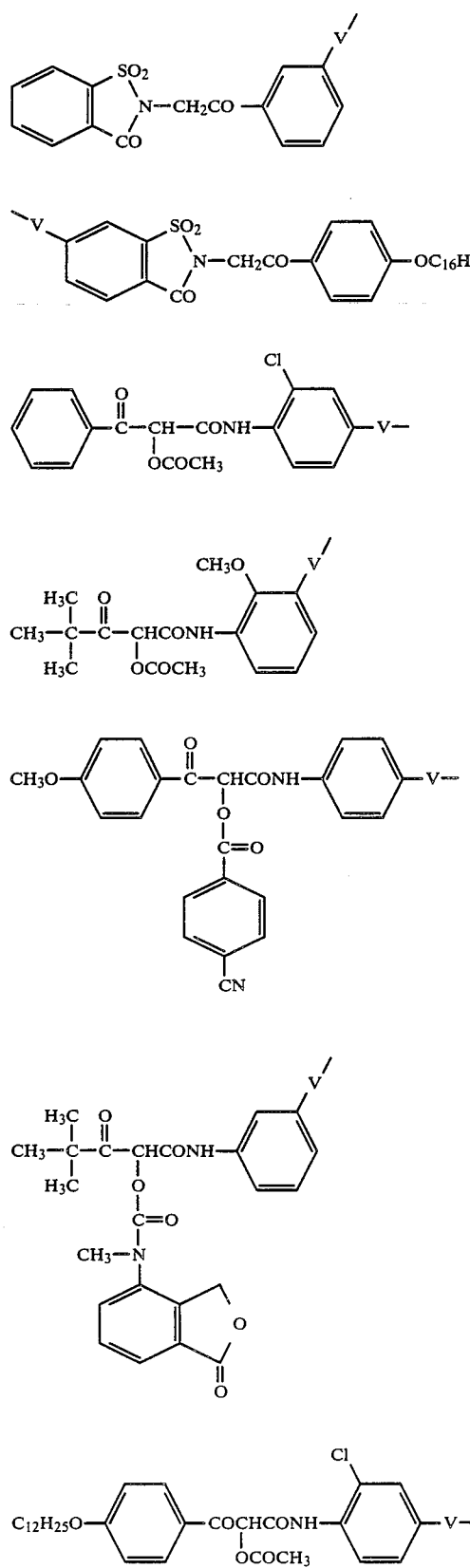
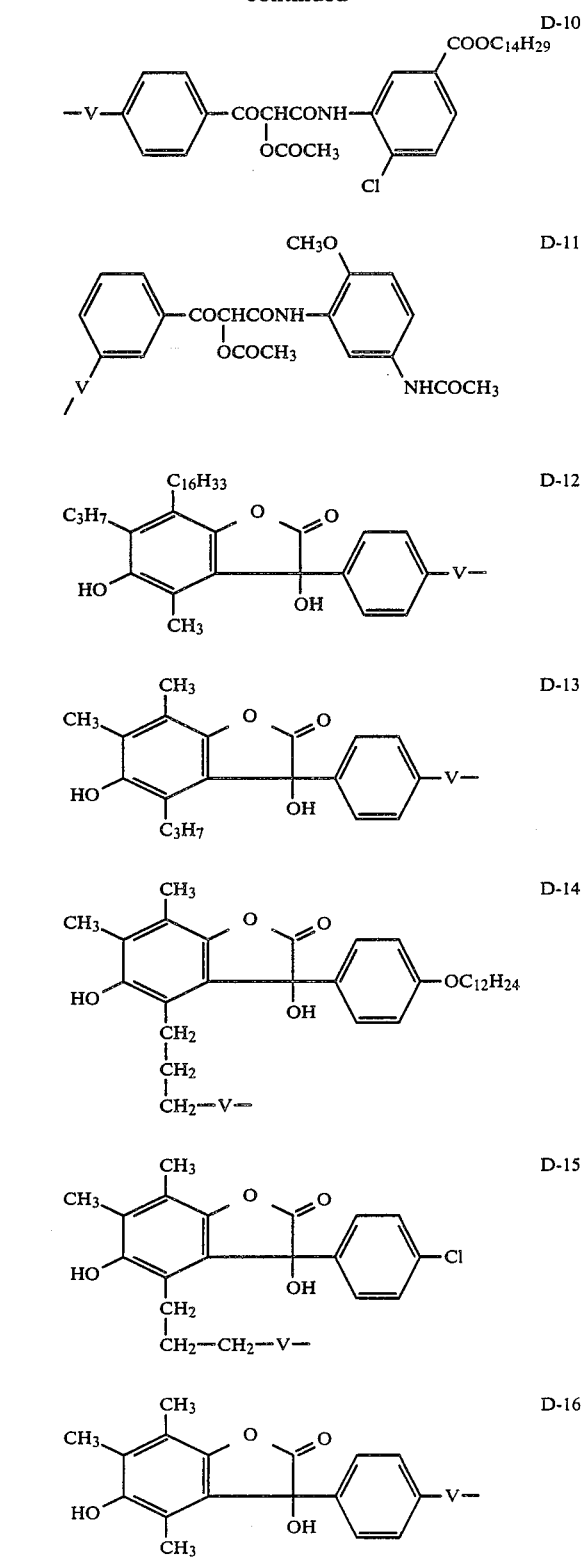
Particularly preferred examples of the groups having the electron donor precursors which are represented by the foregoing general formula (X) include

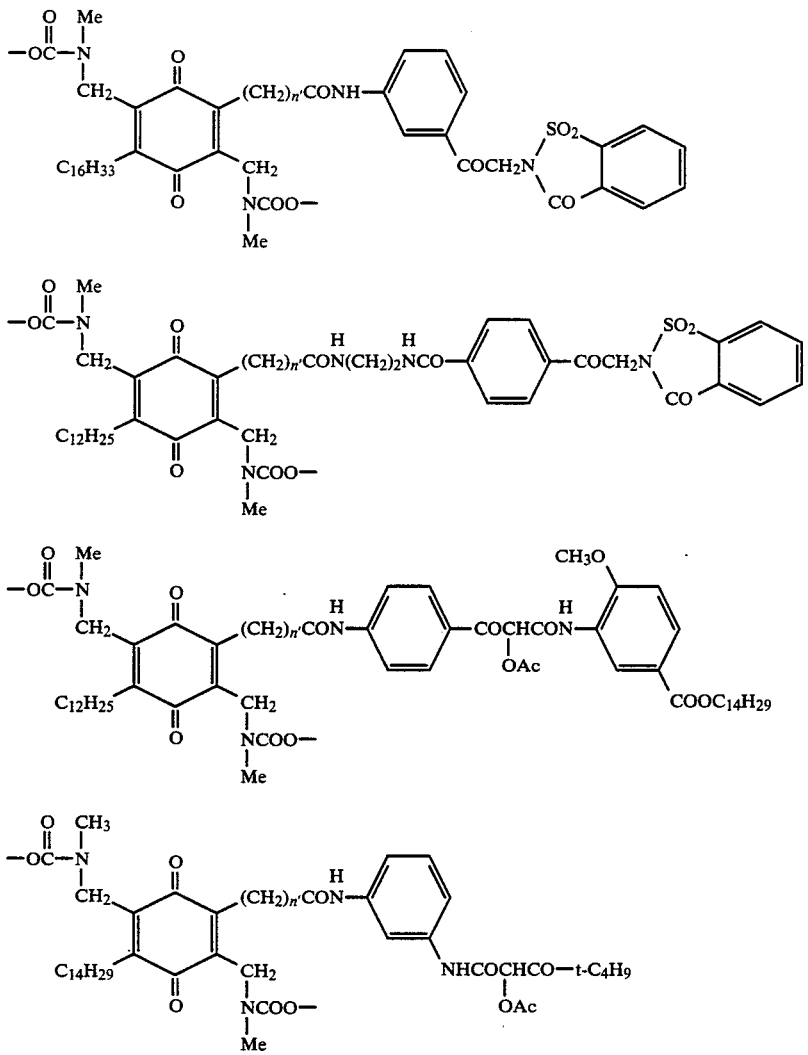

wherein n' is a positive integer, Me is a methyl group, and AC is an acetyl group.

Other examples of groups which are suitable as Y for the compounds of the type as described above are the groups represented by formula (XII).

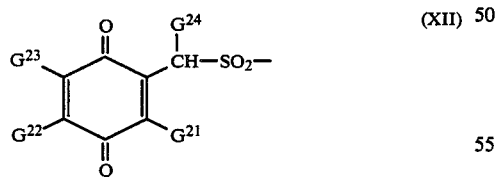

(XII)

In formula (XII), $G^{21}$, $G^{22}$ and $G^{23}$ are each a hydrogen atom, a halogen atom, an alkyl group, a substituted alkyl group, an alkoxy group, a substituted alkoxy group, an aryl group, a substituted aryl group, or an acylamino group, and $G^{22}$ and $G^{23}$ may combine together to form a condensed ring;

$G^{24}$ is a hydrogen atom, an alkyl group, or a substituted alkyl group; and at least one of $G^{21}$, $G^{22}$, $G^{23}$ and $G^{24}$ contains a ballast group.

The groups represented by formula (XII) include a group represented by formula (XIIa).

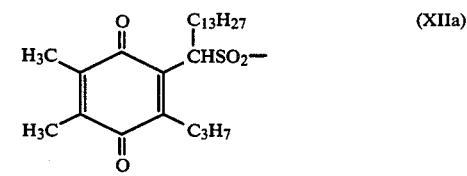

(XIIa)

More detailed examples are described in Japanese Patent Application (OPI) No. 119345/82.

Other examples of groups which are suitable as Y for the compounds of the type as described above are the groups represented by formula (XIII).

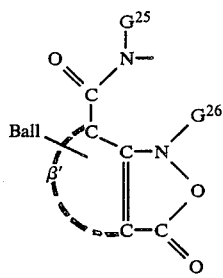  (XIII)

In formula (XIII),

Ball and β' are the same as defined for formula (II); and $G^{23}$ and $G^{26}$ are the same as $G^{19}$ as defined for formula (VIII).

Representative examples of Y of this type are described in Japanese Patent Application (OPI) No. 111628/74 (corresponding to U.S. Pat. No. 3,421,964) and U.S. Pat. No. 4,199,355.

Another type of compounds represented by formula (I) are non-diffusible compounds which release a diffusible dye when undergoing a coupling reaction with an oxidized product of a color developer resulting from oxidation with silver halide (i.e., dye-releasing couplers). Typical examples of Y which is suitable for the compounds of this type are described in U.S. Pat. No. 3,227,550. For example, Y can be a group according to formula (XIV).

(Ball-Coup)$_t$-Link-  (XIV)

In formula (XIV),

Coup represents a coupler residue capable of coupling with an oxidized product of a color developer, such as a 5-pyrazolone type coupler residue, a phenol type coupler residue, a naphthol type coupler residue, an indanone type coupler residue, and an open chain ketomethylene coupler residue;

Ball represents a ballast group;

Link represents a group which is linked to an active site of the Coup portion and which is capable of causing a cleavage between the Coup portion and it when a dye image-forming compound of formula (I), containing the group of formula (XIV) as Y, undergoes a coupling reaction with an oxidized product of a color developer, such as an azo group, an azoxy group, —O—, —S—, —S—S—, and —NHSO$_2$; and t is 1 or 2 when Link is an alkylidene group, and is 1 when Link is another group.

Preferred examples of Y of formula (XIV) are those in which Coup is a phenol type coupler residue, a naphthol type coupler residue, or an indanone type coupler residue, and Link is —NHSO$_2$—.

A particularly effective group as Y is an N-substituted sulfamoyl group. The N-substituent for this N-substituted sulfamoyl group is preferably a carbon ring group or a heterocyclic group. Particularly preferred examples of the N-carbon ring-substituted sulfamoyl group are those represented by formulae (II) and (III). Particularly preferred examples of the N-heterocyclic ring-substituted sulfamoyl group are those represented by formulae (IV) and (V).

The expression "ballast group" as used herein means a group which is linked to the compounds of the present invention so as to permit them to exist in the form of a non-diffusible substance in hydrophilic colloids commonly used in photographic materials.

Since diffusibility or non-diffusibility varies depending on the size of the compound (size of molecule), if the whole molecule is sufficiently large, it is sometimes sufficient that a relatively short group can be used as the ballast group.

More preferred compounds of the present invention are those represented by formula (I) wherein the groups are defined specifically as follows:

$R^1$ is an alkyl group having from 1 to 3 carbon atoms;

$R^2$ is —NHSO$_2R^{2'}$ (wherein $R^{2'}$ is an alkyl group having from 1 to 3 carbon atoms), or —SO$_2$NHR$^{2''}$ (wherein $R^{2''}$ is a hydrogen atom or an alkyl group having from 1 to 3 carbon atoms);

W is —SO$_2$—;

X is

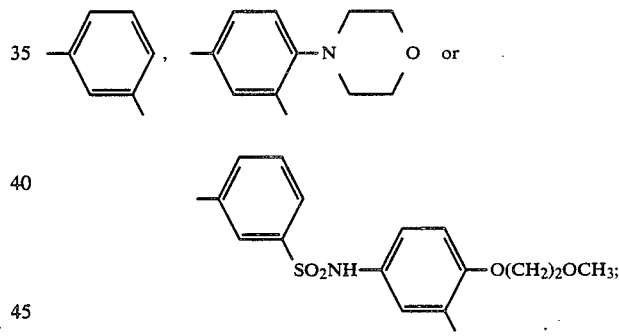

$Z^1$ is a halogen atom, a cyano group, a nitro group, —SO$_2NR^5R^6$ (wherein $R^5$ and $R^6$ may be the same or different, and are each a hydrogen atom, or an alkyl group having from 1 to 3 carbon atoms), or an alkylsulfonyl group having from 1 to 3 carbon atoms;

$Z^2$ is a hydrogen atom, a halogen atom, a nitro group, or a cyano group;

Y is a group represented by formula (III); and

A is a hydroxyl group.

Representative examples of the compounds of the present invention are shown below.

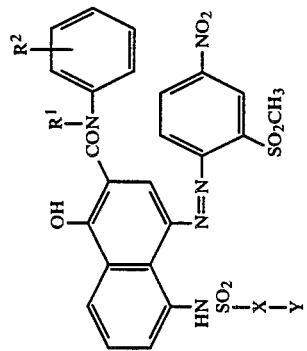

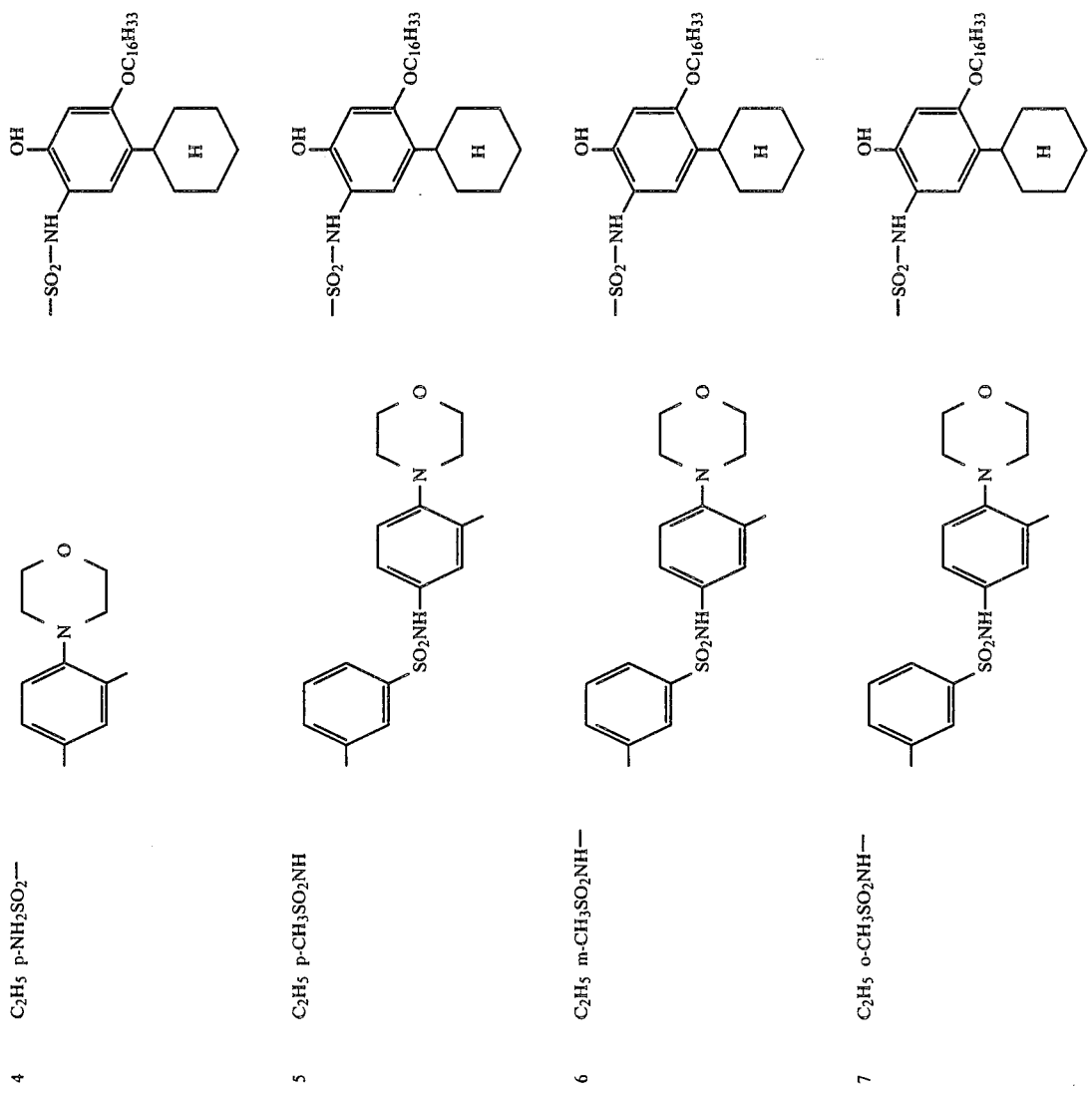

| | | |
|---|---|---|
| 8 | C₂H₅ p-NH₂SO₂— | 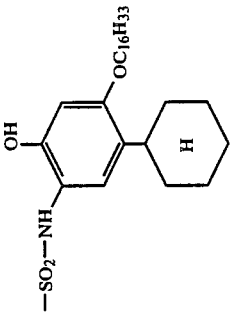 |
| 9 | C₂H₅ p-NH₂SO₂— | 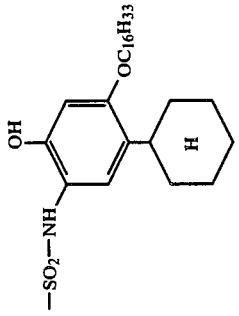 |
| 10 | C₂H₅ p-CH₃SO₂NH— | 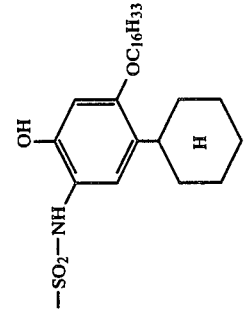 |
| 11 | C₂H₅ p-CH₃SO₂NH— | 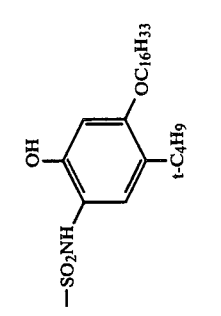 |

-continued
| | | | |
|---|---|---|---|
| 12 | CH$_3$ | p-CH$_3$SO$_2$NH— |  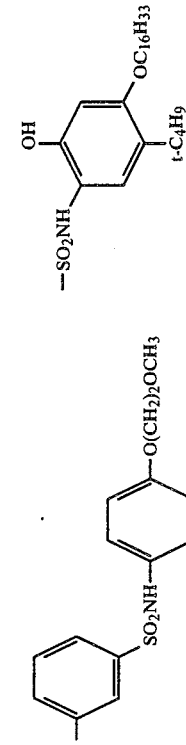 |
| 13 | CH$_3$ | m-CH$_3$SO$_2$NH— | 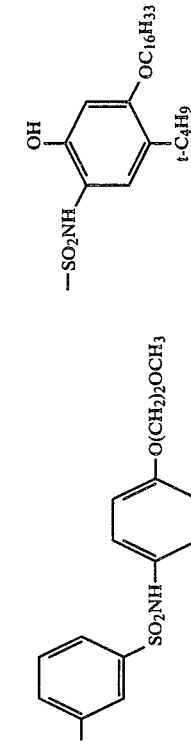 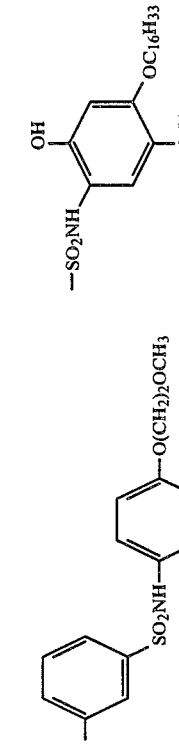 |
| 14 | CH$_3$ | o-CH$_3$SO$_2$NH— | 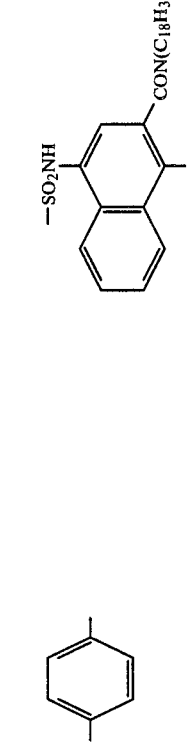  |
| 15 | CH$_3$ | p-NH$_2$SO$_2$— | 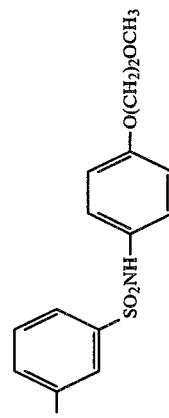 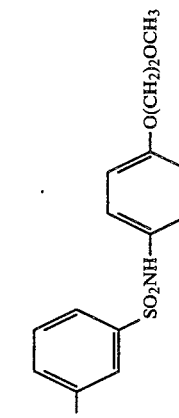 |
| 16 | CH$_3$ | 3,5-diCH$_3$SO$_2$NH— | 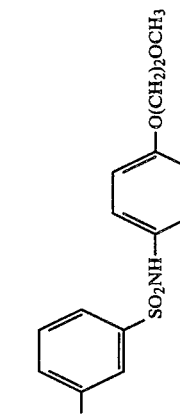 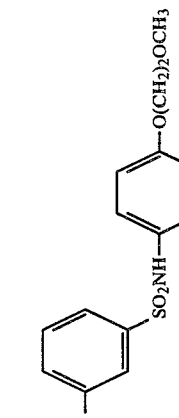 |

-continued

| | | |
|---|---|---|
| 17 | CH₃ p-C₂H₅SO₂NH— | (m-phenylene) | —SO₂NH-(4-position of 1-hydroxy-2-naphthamide)-CON(CH₂)₃O-(2,4-di-t-C₅H₁₁-phenyl) |
| 18 | C₂H₅ p-CH₃SO₂NH— | (m-phenylene) | 2-OH, 4-OC₂₂H₄₅-t, 5-C₈H₁₇-t, —SO₂NH— |
| 19 | C₂H₅ p-CH₃SO₂NH— | (m-phenylene) | 2-OH, 4-C₄H₉-t, 5-OC₁₆H₃₃, —SO₂NH— |
| 20 | C₂H₅ p-CH₃NHSO₂— | (m-phenylene) | 2-OH, 4-C₄H₉-t, 5-OC₁₆H₃₃, —SO₂NH— |
| 21 | C₂H₅ p-NH₂—SO₂— | (m-phenylene with CH₃, SO₂NCH₂CH₂—) | 2-NO₂, 3-C₁₂H₂₅SO₂, 5-SO₂C₁₂H₂₅, —C(O)N(CH₃)— |

-continued
| | | |
|---|---|---|
| 22 | $C_2H_5$ p-$CH_3SO_2NH-$ 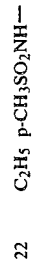 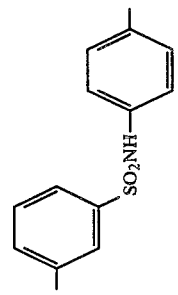 | 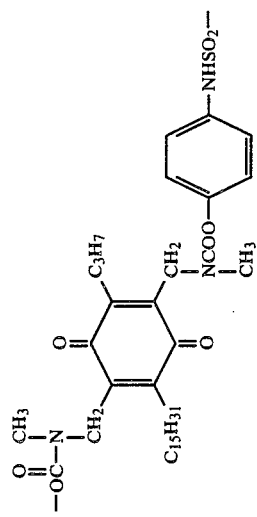 |
| 23 | $C_2H_5$ p-$CH_3SO_2NH-$ 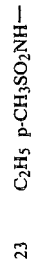 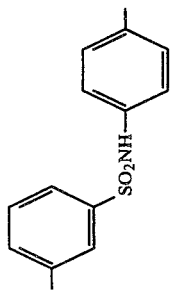 | 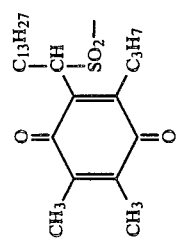 |
| 24 | $C_2H_5$ p-$CH_3SO_2NH-$  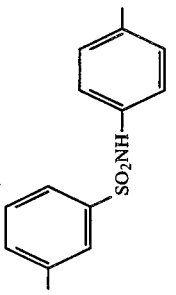 | 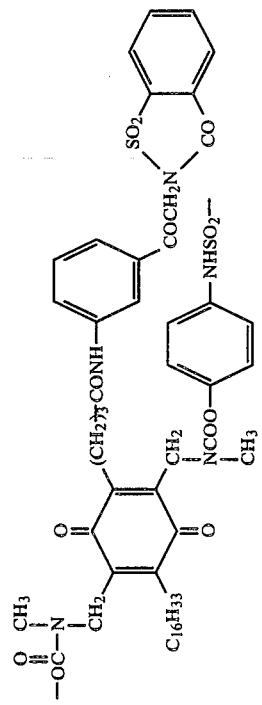 |
| 25 | $C_2H_5$ p-$CH_3SO_2NH-$ 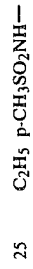 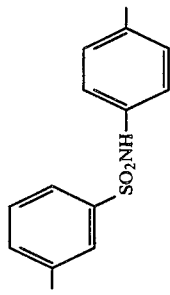 | 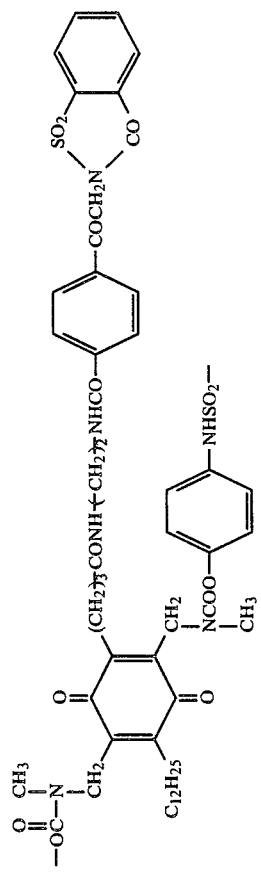 |

-continued
| | | |
|---|---|---|
| 26 | $C_2H_5$ | p-$CH_3SO_2NH-$ |
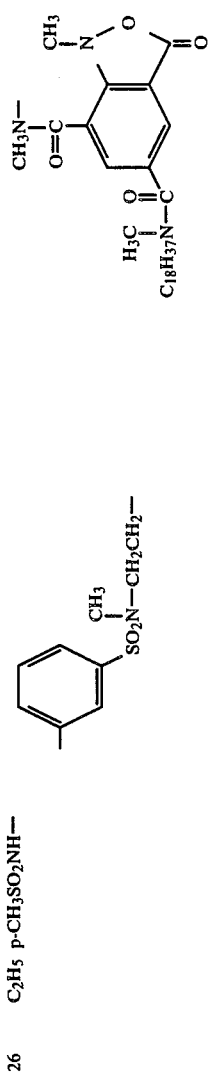
Compound 27
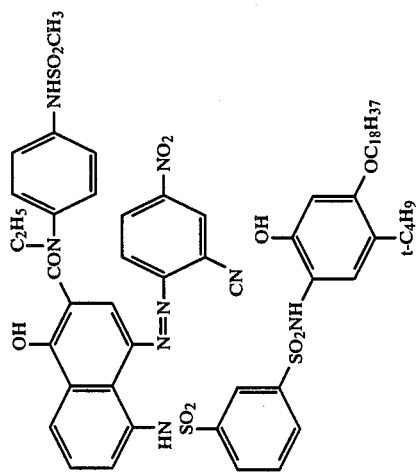
Compound 28

-continued
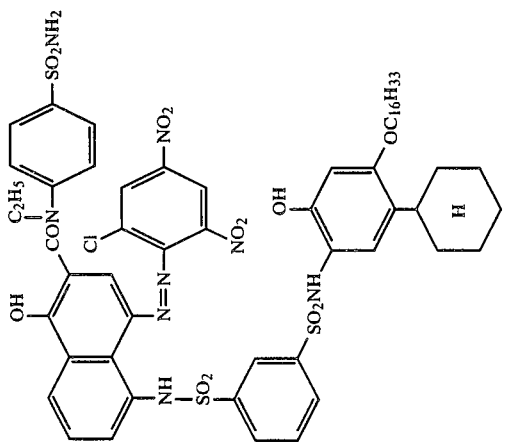

A preparation example for the synthesis of Compound 11 as a typical example is shown below. Other compounds can be prepared in an analogous manner to the case of Compound 11.

PREPARATION EXAMPLE

Compound 11 was prepared by the following reaction sequence.

water, and crystals precipitated were collected by filtration. These crystals were added to 20 ml of methanol, heated to reflux, and then allowed to cool. The resulting crystals were collected by filtration. The yield was 4.5 g.

The Intermediate (b) could be prepared in the same manner as above even when 2-carboxy-5-chloroacetylamino-1-naphthol was used in place of

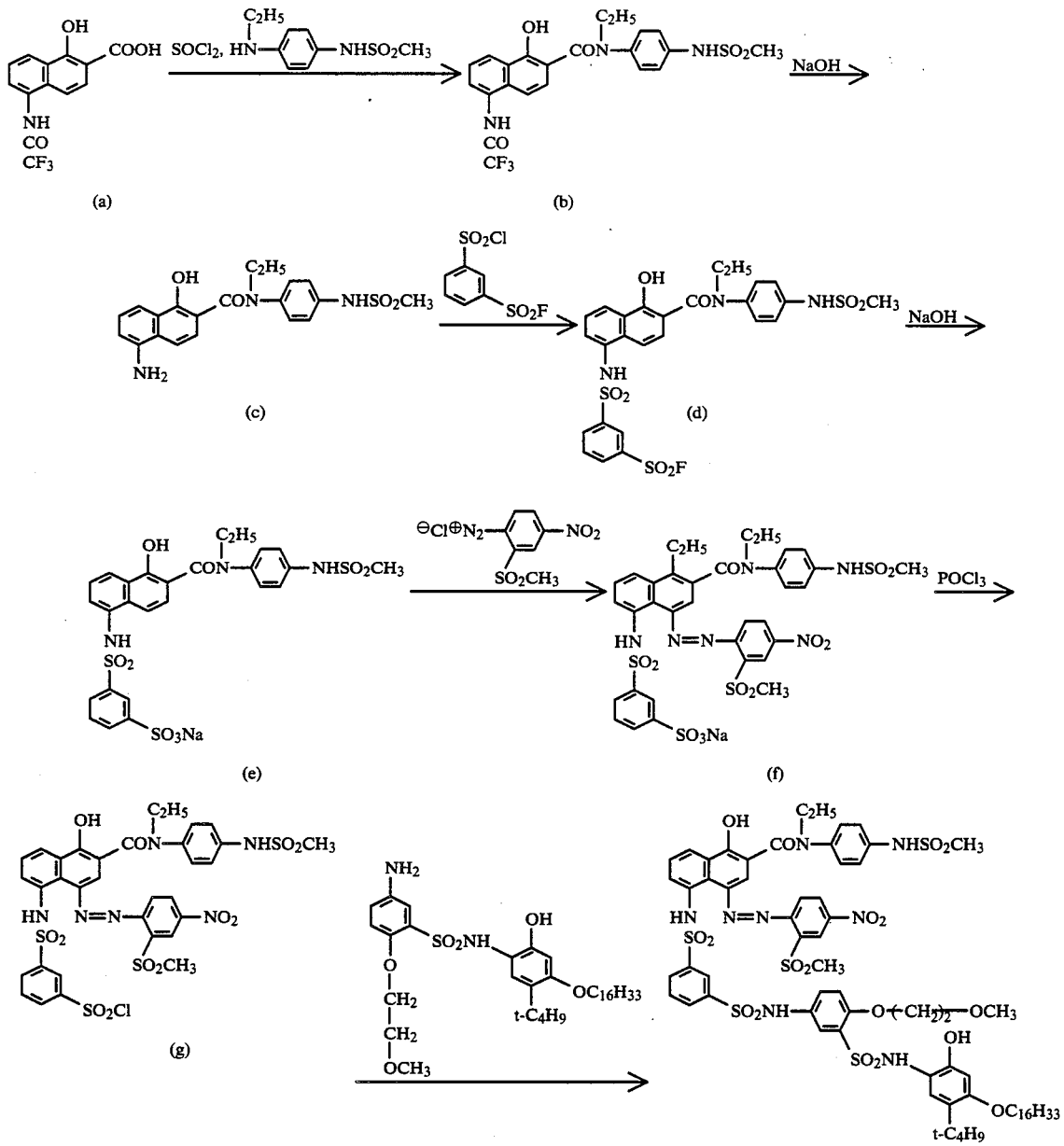

Compound 11

Preparation of Intermediate (b)

A mixture of 3.5 g of Compound (a), 3.8 g of p-methanesulfonamido-N-methylaniline, and 30 ml of N,N-dimethylacetamide was heated to 35° C. and stirred. Then, 1.2 ml of thionyl chloride was added thereto, and they were reacted at 50° C. for 40 minutes. The reaction mixture was poured into 200 ml of ice Compound (a).

Preparation of Intermediate (c)

A mixture of 3.3 g of the Intermediate (b) and 35 ml of a 10% aqueous caustic soda solution was stirred in a stream of nitrogen at 45° to 50° C. for 1 hour. The mixture was then added to a solution consisting of 10 ml of acetic acid and 100 ml of ice water, and crystals precipitated were collected by filtration. The yield was 2.6 g.

Preparation of Intermediate (d)

A mixture of 2.9 g of the Intermediate (c), 30 ml of methylene chloride, 10 ml of N,N-dimethylacetamide, and 1.5 ml of pyridine was stirred while cooling with ice. Then, 2.1 g of fluorosulfonylbenzenesulfonyl chloride was added dropwise thereto over 2 minutes. The ice bath was removed, and they were allowed to react for 1 hour. To the reaction mixture, 20 ml of water and then 2 ml of concentrated hydrochloric acid were added, and then the resulting mixture was allowed to separate. A methylene chloride layer was washed with 30 ml of water. Methylene chloride was distilled away, yielding 4.6 g of the desired product.

Preparation of Intermediate (e)

A mixture of 4.6 g of the Intermediate (d) and 50 ml of a 10% aqueous caustic soda solution was stirred at room temperature for 1 hour, whereupon an aqueous solution of the desired product could be obtained. This aqueous solution was used as such in the subsequent reaction.

Preparation of Intermediate (f)

A 2-methanesulfonyl-4-nitroaniline diazonium salt was first prepared by the following procedure.

To 25 ml of concentrated sulfuric acid was added 3.8 g of sodium nitrite while stirring. They were reacted at 70° C. for 30 minutes and then cooled with ice. To the reaction mixture, 40 ml of acetic acid and 10 ml of propionic acid were gradually added in such a manner that the temperature did not exceed 15° C. Then, 10.8 g of 2-methanesulfonyl-4-nitroaniline was gradually added thereto in such a manner that the temperature did not exceed 5° C. They were reacted at 5° C. for 3 hours to yield the desired diazonium salt.

To the whole aqueous solution containing the Intermediate (e) obtained in the preceding step, there were added 17.5 g of sodium acetate, 63 ml of methyl cellosolve and 19 ml of acetic acid and then after cooling with ice, was gradually added 15.5 ml of the above-prepared diazonium salt solution. In this procedure, care was taken so that the temperature did not exceed 5° C. They were reacted at 5° C. for 1 hour, and then the reaction mixture was poured into 300 ml of a cooled saturated aqueous solution of salt containing 18 ml of hydrochloric acid. Crystals precipitated were collected by filtration. The yield was 4.0 g.

Preparation of Intermediate (g)

A mixture of 3.0 g of the Intermediate (f), 15 ml of acetonitrile, and 3 ml of phosphorus oxychloride was stirred at 50° C. To the mixture was added 3 ml of N,N-dimethylacetamide. They were reacted at 80° C. for 20 minutes and then poured into 150 ml of ice water. Crystals obtained were collected by filtration. The yield was 2.7 g.

Preparation of Compound 11

To a mixture of 1.9 g of 3-(2-hydroxy-4-hexadecyloxy-5-tert-butylphenyl)sulfamoyl-4-(2-methoxyethoxy)aniline, 40 ml of methylene chloride, 10 ml of N,N-dimethylacetamide, and 0.7 ml of pyridine was added 2.8 g of the Intermediate (g) in a stream of nitrogen at room temperature over 2 minutes. They were reacted for 40 minutes and then 40 ml of water was added thereto. A methylene chloride layer was separated, washed with water, and then methylene chloride was distilled away under reduced pressure. The residue was purified by silica gel chromatography (an eluting solution: a chloroform/ethyl acetate (1:4 by volume) mixture) and then recrystallized from methanol. The yield was 2.5 g and the melting point (m.p.) was 156° to 159° C.

In the same manner as above, Compounds 1 to 10 and 12 to 15 were prepared, and their melting points are shown in Table A below.

TABLE A

| Compound No. | m.p. (°C.) |
| --- | --- |
| 1 | 144–149 |
| 2 | 155–158 |
| 3 | 158–165 |
| 4 | 180–185 |
| 5 | 175–180 |
| 6 | 152–156 |
| 7 | 170–178 |
| 8 | 164–167 |
| 9 | 155–160 |
| 10 | 150–155 |
| 12 | 156–159 |
| 13 | 145–150 |
| 14 | 143–152 |
| 15 | 168–175 |

A method of using a compound represented by formula (I) of the present invention will hereinafter be explained with reference to a dye-releasing redox compound (DRR compound).

The amount of the redox compound of formula (I) used is generally from about $1 \times 10^{-4}$ to $1 \times 10^{-2}$ mol/m$^2$, and preferably is from about $2 \times 10^{-4}$ to $2 \times 10^{-3}$ mol/m$^2$.

The redox compound can be dispersed in a hydrophilic colloid as a binder by various procedures. This procedure is determined depending on the type of the redox compound. In the case of compounds having a group capable of undergoing dissociation, such as a sulfo group and a carboxyl group, they can be dispersed by a procedure in which they are first dissolved in water or an alkaline aqueous solution and then added to a hydrophilic colloid solution.

On the other hand, compounds sparingly soluble in aqueous media but easily soluble in organic solvents can be dispersed by the following procedures.

(1) The compound is first dissolved in a substantially water-insoluble high boiling solvent and the resulting solution is then added to and dispersed in a hydrophilic colloid solution. This method is described, for example, in U.S. Pat. Nos. 2,322,027, 2,533,514, 2,801,171 and Japanese Patent Application (OPI) No. 101648/84 (corresponding to U.S. Ser. No. 557,301, filed on Dec. 2, 1983). In particular, the solvents described in Japanese Patent Application (OPI) No. 101648/84 are preferred. If necessary, low boiling solvents or organic solvents which are easily soluble in water may be used, and these solvents are removed by evaporation through drying, washing with water, and so forth.

(2) The compound is dissolved in a water-compatible solvent and then dispersed in a hydrophilic colloid solution.

(3) The compound is dispersed in the same manner as in (1) with the exception that a lipophilic polymer is used in place of the high boiling solvent or in combination with the high boiling solvent. This method is described, for example, in U.S. Pat. No. 3,619,195 and West German Patent No. 1,957,467.

(4) The compound is dissolved in a water-compatible solvent, and an aqueous latex is gradually added to the above-prepared solution, whereupon there is obtained a dispersion in which the compound is contained in latex particles. This method is described, for example, in Japanese Patent Application (OPI) No. 59943/76.

To the above-prepared hydrophilic colloid dispersion may be added a hydrosol of a lipophilic polymer as described, for example, in Japanese Patent Publication No. 39835/76.

Dispersion of the redox compound is greatly facilitated by the use of surface active agents as emulsifying aids. Useful surface active agents are described, for example, in Japanese Patent Publication No. 4923/64, and U.S. Pat. No. 3,676,141.

Hydrophilic colloids which can be used in dispersing the redox compounds as used herein include cellulose derivatives such as gelatin, colloidal albumin, casein, carboxymethyl cellulose, and hydroxyethyl cellulose, sugar derivatives such as agar, sodium alginate, and starch derivatives, and synthetic hydrophilic colloids such as polyvinyl alcohol, poly(N-vinyl)pyrrolidone, acrylic acid copolymers, polyacrylamide or their derivatives (e.g., partially hydrolyzed products). If desired, a mutually soluble mixture of two or more colloids can be used. Of the above-described compounds, gelatin is most commonly used. This gelatin may be replaced, partially or entirely, with a synthetic hydrophilic colloid.

The photographic light-sensitive material of the present invention is used, for example, as a heat-developable photographic light-sensitive material (e.g., a light-sensitive material as described in Published Unexamined European Patent Application No. EP 76,492 A2) and a color diffusion transfer light-sensitive material.

Other materials needed when the photographic light-sensitive material of the present invention is used in the color diffusion transfer method will hereinafter be described.

When the light-sensitive material of the present invention is a photographic film unit, which is designed so that it can be processed by passing between a pair of pressing members arranged in parallel to each other, it comprises the following elements:

1. a light-sensitive element including a silver halide emulsion layer in which the redox compound of the present invention is used in combination;
2. an image-receiving element;
3. a means to release an alkaline processing composition in the inside of the film unit, such as a rupturable container;
4. at least one support; and
5. a stripping layer provided between the elements 1 and 2 as described above, if desired.

An embodiment of the film unit is such that a light-sensitive element comprising a support and at least one silver halide emulsion layer (in which the redox compound of the present invention is used in combination as in the layers as described hereinafter) coated on the support is exposed imagewise, superposed on an image-receiving element in a surface-to-surface relation, and then processed by extending an alkaline processing composition between the two elements. It is preferred that when removed from a camera, the film unit be shielded from light at both sides of the light-sensitive element or film unit. In this case, the image-receiving element may be stripped off, or the image may be made visible without separation of the image-receiving element as described in U.S. Pat. No. 3,415,645.

In another embodiment, an image-receiving element and a light-sensitive element are provided in combination on a support of the film unit. A film unit as disclosed in Belgian Pat. No. 757,960, for example, is useful in which an image-receiving layer, a substantially opaque light-reflective layer (i.e., a $TiO_2$ layer and a carbon black layer), and at least one light-sensitive layer are coated on a transparent support. The light-sensitive layer is exposed, superposed on a transparent cover sheet in a surface-to-surface relation, and then a processing composition is distributed between the light-sensitive layer and the cover sheet.

Belgian Pat. No. 757,959 discloses another embodiment which is of the type that an image-receiving element and a light-sensitive element are provided in combination or in an integrated form, and to which the present invention is applicable. In this embodiment, an image-receiving layer, a substantially opaque light-reflective layer (e.g., a layer as described above), and at least one light-sensitive layer are coated on a transparent support, and further a transparent cover sheet is superposed thereon in a surface-to-surface relation. Rupturable containers containing an alkaline processing composition containing an opacifying agent are distributed adjacent to the uppermost layer of the light-sensitive layer and also to the transparent cover sheet. This film unit is exposed to light through the transparent cover sheet, and when it is taken out of a camera, the containers are ruptured by means of a pressing member, thereby spreading the processing composition (containing an opacifying agent) entirely between the light-sensitive layer and the cover sheet. In this way, the film unit is shielded from light and development is allowed to proceed.

The redox compound of the present invention to be used in combination with a silver halide emulsion layer is of the negative type or of the positive type.

In the present invention, it is preferred to use an electron transfer agent capable of cross-oxidizing a dye-releasing redox compound. A silver halide developing agent to be used in the processing of light-sensitive materials is capable of acting also as an electron transfer agent.

Such developers or electron transfer agents may be incorporated into an alkaline processing composition or into a suitable layer of the photographic element. Typical examples of developers or electron transfer agents which can be used in the present invention are shown below.

Hydroquinones, aminophenols, phenylenediamines, pyrazolidinones [e.g., phenidone, 1-phenyl-3-pyrazolidinone, Dimeson (trademark) (i.e., 1-phenyl-4,4-dimethyl-3-pyrazolidinone), 1-p-tolyl-4-methyl-4-oxymethyl-3-pyrazolidinone, 1-(4'-methoxyphenyl)-4-methyl-4-oxymethyl-3-pyrazolidinone, and 1-phenyl-4-methyl-4-oxymethyl-3-pyrazolidinone], etc., which are described in Japanese Patent Application (OPI) No. 16131/81.

Of the above-described compounds, black-and-white developers generally having a capability to reduce the formation of stain in the image-receiving layer (in particular, the pyrazolidinones) are preferred over color developers such as phenylenediamines.

The processing composition for use in the processing of the light-sensitive material of the present invention contains bases such as sodium hydroxide, potassium hydroxide, sodium carbonate, and sodium phosphate, and is appropriately adjusted to pH of not less than about 9. Preferably it has an alkali strength of not less than 11.5 in pH. It may contain antioxidation agents such as sodium sulfite, ascorbic acid salts, and piperidinohexose reductone, and can contain silver ion concentration-controlling agents such as potassium bromide. In addition, it may contain viscosity-increasing compounds such as hydroxyethyl cellulose and sodium carboxymethyl cellulose.

In this alkaline processing composition may be incorporated compounds capable of accelerating development or diffusion of dye, such as benzyl alcohol.

The light-sensitive material of the present invention contains a support which does not undergo serious dimensional changes during the processing. Such supports include a cellulose acetate film, a polystyrene film, a polyethylene terephthalate film, and a polycarbonate film, which are used in the usual photographic light-sensitive material. In addition, paper, paper with a water-impermeable polymer (e.g., polyethylene) laminated on the surface thereof, etc., are useful.

The present invention is illustrated in greater detail with reference to the following examples, but the present invention is not to be construed as being limited thereto.

EXAMPLE 1

A light-sensitive sheet was prepared by coating layers as shown below on a transparent polyester support in the following order.

(1) A mordanting layer containing 3.0 g/m² of a mordant having the formula as shown below and 3.0 g/m² of gelatin.

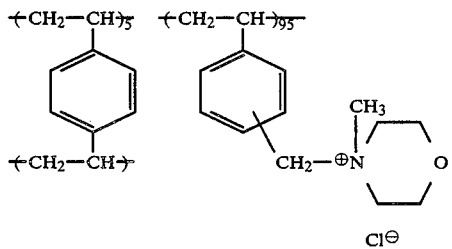

(2) A white light-reflective layer containing 20 g/m² of titanium dioxide and 2.0 g/m² of gelatin.

(3) A light-shielding layer containing 2.70 g/m² of carbon black and 2.70 g/m² of gelatin.

(4) A layer containing 0.36 millimol/m² of Compound 11 (cyan DRR compound), 0.09 g/m² of tricyclohexyl phosphate, 0.01 g/m² of 2,5-di(tert-pentadecyl)hydroquinone, and 0.44 g/m² of gelatin.

(5) A layer containing 0.5 g/m² (calculated as silver) of a red-sensitive internal latent image-type direct reversal silver bromide emulsion, 0.78 g/m² of gelatin, 27 μg/m² of a nucleating agent as shown below, and 0.06 g/m² of sodium pentadecylhydroquinonesulfonate.

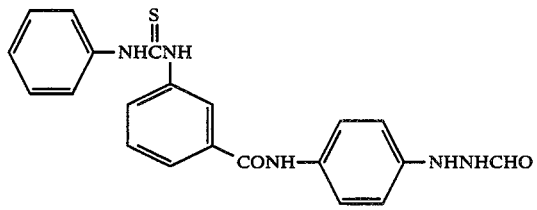

(6) A layer containing 0.71 g/m² of 2,5-di(tert-pentadecyl)hydroquinone, 0.24 g/m² of a vinyl pyrrolidone/vinyl acetate copolymer (molar ratio: 7/3), and 0.4 g/m² of gelatin.

(7) A layer containing 0.3 g/m² of gelatin.

(8) A layer containing 0.49 g/m² of a magenta DRR compound as shown below, 0.08 g/m² of tricyclohexyl phosphate, 0.01 g/m² of 2,5-di(tert-pentadecyl)hydroquinone, and 0.5 g/m² of gelatin.

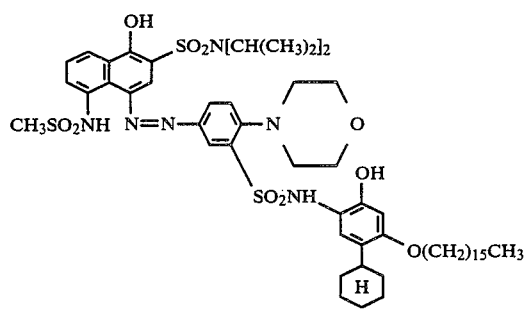

(9) A layer containing 0.34 g/m² (calculated as silver) of a green-sensitive internal latent image-type direct reversal silver bromide emulsion, 0.66 g/m² of gelatin, 12.9 μg/m² of the same nucleating agent as used in the layer (2), and 0.04 g/m² of sodium pentadecylhydroquinonesulfonate.

(10) A layer containing 0.71 g/m² of 2,5-di(tert-pentadecyl)hydroquinone, 0.24 g/m² of a vinyl pyrrolidone/vinyl acetate copolymer (molar ratio: 7/3), and 0.4 g/m² of gelatin.

(11) A layer containing 0.25 g/m² of gelatin.

(12) A layer containing 0.48 g/m² of a yellow DRR compound as shown below, 0.03 g/m² of tricyclohexyl phosphate, 0.004 g/m² of 2,5-di(tert-pentadecyl)hydroquinone, and 0.43 g/m² of gelatin.

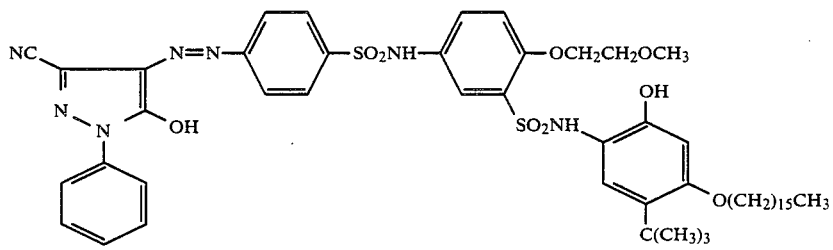

(13) A layer containing 0.84 g/m² (calculated as silver) of a blue-sensitive internal latent image-type direct reversal silver bromide emulsion, 0.9 g/m² of gelatin, 29 μg/m² of the same nucleating agent as used in the layer (5) and 0.05 g/m² of sodium pentadecylhydroquinonesulfonate.

(14) A layer containing 1.0 g/m² of gelatin.

A processing solution having the formulation shown below was filled in 0.8 g of rupturable containers.

| Processing Solution (I) | |
| --- | --- |
| 1-(p-Tolyl)-4-hydroxymethyl-4-methyl-3-pyrazolidinone | 6.9 g |
| tert-Butylhydroquinone | 0.2 g |
| 5-Methylbenzotriazole | 3.5 g |
| Sodium Sulfite (anhydrous) | 0.2 g |
| Sodium Carboxymethyl Cellulose | 58 g |
| Carbon Black | 150 g |
| 28% Aqueous Solution of Potassium Hydroxide | 200 ml |
| Benzyl Alcohol | 1.5 ml |
| Water | 580 ml |

A cover sheet was prepared by coating the layers as shown below on a transparent polyester support in the following order.

(15) A layer containing 22 g/m² of an acrylic acid/butyl acrylate (80:20 by weight) copolymer and 0.44 g/m² of 1,4-bis(2,3-epoxypropoxy)butane.

(16) A layer containing 3.8 g/m² of acetyl cellulose (hydrolysis of 100 g of acetyl cellulose resulted in the formation of 39.4 g of an acetyl group), 0.2 g/m² of a styrene/maleic anhydride (60:40 by weight) copolymer (molecular weight: about 50,000), and 0.115 g/m² of 5-(β-cyanoethylthio)-1-phenyltetrazole.

(17) A layer containing 2.5 g/m² of a vinylidene chloride/methyl acrylate/acrylic acid (85:12:3 by weight) copolymer latex and 0.05 g/m² of a polymethyl methacrylate latex (particle size: 1 to 3 microns).

This light-sensitive material was designated "Sample A". For comparison, a Sample B was prepared in the same manner as in the preparation of Sample A except that Compound 11 was replaced by Compound (I) as shown below, a comparative compound described in Japanese Patent Application (OPI) No. 143323/78.

Samples A and B were each exposed to light and then combined together with the processing solution and cover sheet as produced above, and passed through a pressing member at 25° C. to extend the processing solution in a thickness of 80 μm, whereupon a transferred color image was obtained.

After the cover sheet was stripped off, it was dried and then subjected to a fading test for 1 week by the use of a 7,000 lux fluorescent light fading tester.

The results are shown in Table 1 below.

TABLE 1

| Sample | Residue at Cyan Density of 1.0 (%) |
| --- | --- |
| A | 81 |
| B (comparative sample) | 56 |

It can be seen from the results of Table 1 that the cyan DRR compound of the present invention increases light-fastness much more than the Comparative Compound (I).

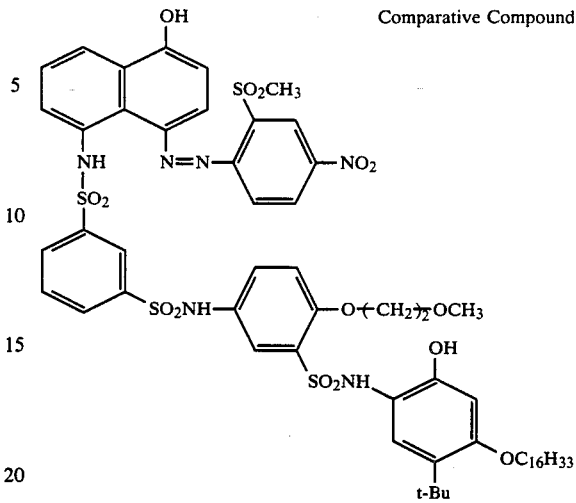

Comparative Compound (I)

EXAMPLE 2

The layers (4) to (14) of Example 1 were coated on a black support in the same sequence to prepare a light-sensitive sheet. The layers (15), (16), (17) and (1) of Example 1 were coated in the listed sequence on a white support on the reverse side of which had been coated a titanium white layer and a carbon black layer, and further a phthalated gelatin layer (1 g/m²) was coated thereon to prepare a dye image-receiving sheet.

The above-prepared light-sensitive sheet was designated "Sample A'". Another light-sensitive sheet, Sample C, was prepared in the same manner as above except that Compound 11 (cyan DRR compound) was replaced by Compound 15. For comparison, a comparative light-sensitive sheet, Sample D, was prepared in the same manner as above except that Compound 11 was replaced by Compound (II) as described in Japanese Patent Application (OPI) No. 99431/79.

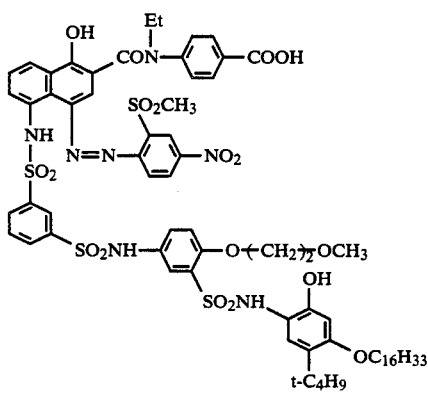

Comparative Compound (II)

Samples A', C and D were each exposed to light. Each exposed sample was superposed on the dye image-receiving sheet, and a Processing Solution (II) as described below was distributed in a thickness of 60 μm at a predetermined temperature by means of a pressing member. After a predetermined period of time, the dye image-receiving sheet was separated from the light-sensitive sheet, whereupon a transferred color image was obtained.

| Processing Solution (II) | |
|---|---|
| Benzyl Alcohol | 0.20 ml |
| 1-(p-Tolyl)-4-hydroxymethyl-4-methyl-3-pyrazolidinone | 0.3 g |
| Methylhydyroquinone | 0.012 g |
| 5-Methylbenzotriazole | 0.6 g |
| Sodium Sulfite | 0.18 g |
| Hydroxymethyl Cellulose | 4 g |
| 28% Aqueous Solution of Potassium Hydroxide | 22.4 ml |
| Water | 67 ml |

The sensitometry results obtained are shown in Table 2. It can be seen that the Comparative Compound (II) exhibits considerably high temperature dependency and can provide only a very low maximum density even at 25° C., whereas the Compounds (11) and (15) of the present invention can produce a high maximum density and constant photographic characteristics over a wide temperature range.

TABLE 2

| Sample | Maximum Density | | |
|---|---|---|---|
| | 15° C. | 25° C. | 35° C. |
| A' | 2.74 | 3.10 | 2.84 |
| C | 2.56 | 2.50 | 2.20 |
| D (comparative sample) | 2.30 | 2.00 | 1.70 |

EXAMPLE 3

The layers (1) to (7) of Example 1 were coated on a transparent polyester support to prepare a light-sensitive sheet, Sample E.

Another light-sensitive sheet was prepared in the same manner as above except that the cyan DRR compound in Sample E was replaced by Compound 4 of the present invention (Sample F). For comparison, a light-sensitive sheet, Sample G, was prepared in the same manner as above except that the cyan DRR compound in Sample E was replaced by Compound (III) as shown below.

Comparative Compound (III)

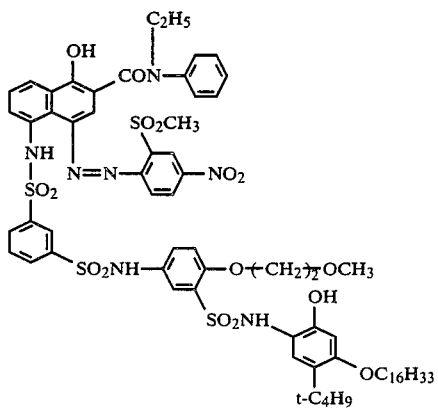

Samples E to G were each exposed to light and then subjected to the same treatment as in Example 1, whereupon a transferred color image was obtained. For each color image an absorption spectrum at an area where the reflective density was 1.0 was measured by the use of a spectral photometer. The results are shown in Table 3.

It can be seen from the results of Table 3 that for the Comparative Compound (III), the absorption component at a shorter wavelength side is large and the half-value width of the absorption is large, whereas for the Compounds 4 and 11 of the present invention, the half-value width of the absorption is narrow and a very satisfactory cayn hue can be obtained.

TABLE 3

| Sample | Compound | $\lambda_{max}$ (nm) | Half-Value Width (nm) |
|---|---|---|---|
| E | Compound 11 | 654 | 96 |
| F | Compound 4 | 655 | 98 |
| G | Comparative Compound (III) | 652 | 104 |

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material containing a compound represented by formula (I)

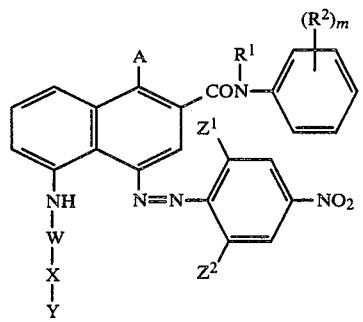

wherein
$R^1$ is an alkyl group or a substituted alkyl group;
$R^2$ is —NHSO$_2$R$^{2'}$ [wherein $R^{2'}$ is a substituted or unsubstituted alkyl group, an aryl group, a heterocyclic ring, or

(wherein D and D' may be the same or different and are each a hydrogen atom or an alkyl group)], or —SO$_2$NH—R$^{2''}$ (wherein $R^{2''}$ is a hydrogen atom, a substituted or unsubstituted alkyl group, or a substituted or unsubstituted aryl group), and may be positioned at any of the ortho-, meta-, and para-positions relative to the

group;
m is an integer of 1 or 2;
W is —SO$_2$— or —CO—;

X is a divalent connecting group represented by the formula —$R^3$—$L_n$—$R^{3'}{}_p$— (wherein $R^3$ and $R^{3'}$ may be the same or different, and are each a substituted or unsubstituted alkylene group, a substituted or unsubstituted arylene group, or a substituted or unsubstituted aralkylene group; L is a divalent group selected from an oxy group, a carbonyl group, a carboxyamido group, a carbamoyl group, a sulfonamido group, a sulfamoyl group, a sulfinyl group, and a sulfonyl group; and n and p are each 0 or an integer of 1);

Y is a redox center capable of releasing a diffusible dye on undergoing a self-cleavage as a result of a redox reaction;

$Z^1$ is a halogen atom, a cyano group, a nitro group, a trifluoromethyl group, an alkyl group, an alkoxy group, a carboxyl group, a carboxylic acid ester group represented by the formula —$COOR^4$ (wherein $R^4$ is a substituted or unsubstituted alkyl group, or a substituted or unsubstituted phenyl group), a fluorosulfonyl group, a substituted or unsubstituted phenoxysulfonyl group, a group represented by the formula —$SO_2NR^5R^6$ (wherein $R^5$ is a hydrogen atom, a substituted or unsubstituted alkyl group; $R^6$ is a hydrogen atom, a substituted or unsubstituted alkyl group, a substituted or unsubstituted aralkyl group, or a substituted or unsubstituted aryl group; and $R^5$ and $R^6$ may be combined together directly or through an oxygen atom to form a ring), a group represented by the formula —$CONR^5R^6$ (wherein $R^5$ and $R^6$ are the same as defined above), a substituted or unsubstituted alkylsulfonyl group, a substituted or unsubstituted aralkyl group, or a substituted or unsubstituted phenylsulfonyl group;

$Z^2$ is a hydrogen atom, a halogen atom, a nitro group, a cyano group, or a trifluoromethyl group; and A is a hydroxyl group or a group forming a hydroxyl group upon decomposition.

2. A silver halide photographic light-sensitive material as in claim 1, wherein $R^1$ is an alkyl group having from 1 to 6 carbon atoms or a substituted alkyl group having from 1 to 10 carbon atoms;

$R^2$ is an alkanesulfonamido group having from 1 to 6 carbon atoms, an unsubstituted sulfamoyl group or an alkylsulfamoyl group having from 1 to 6 carbon atoms;

m is 1 or 2;

W is —$SO_2$—;

X is a divalent connecting group represented by the formula —$R^3$—$L_n$—$R^{3'}{}_p$—, wherein $R^3$ or $R^{3'}$ is an alkylene group having from 1 to 6 carbon atoms, a substituted alkylene group having from 1 to 10 carbon atoms, an arylene group, or a substituted arylene group;

L, n and p each has the same meanings as those in claim 1;

Y is a redox center capable of releasing a diffusible dye on undergoing a self-cleavage as a result of a redox reaction;

$Z^1$ is a halogen atom, a cyano group, a nitro group, a straight or branched alkyl group having from 1 to 6 carbon atoms, a straight or branched alkoxy group having from 1 to 8 carbon atoms, —$SO_2NR^5R^6$ wherein $R^5$ is hydrogen or a substituted or unsubstituted alkyl group having from 1 to 6 carbon atoms, $R^6$ is a hydrogen atom, an alkyl group having from 1 to 6 carbon atoms, a benzyl group, or a substituted or unsubstituted phenyl group having from 6 to 9 carbon atoms, or $R^5$ and $R^6$ combine together to form a 5- or 6-membered heterocyclic ring, —$CONR^5R^6$, wherein $R^5$ and $R^6$ are the same as defined above, —$SO_2R^{10}$, wherein $R^{10}$ is a substituted or unsubstituted alkyl group having from 1 to 6 carbon atoms or a benzyl group, or —$COOR^7$, wherein $R^7$ is a substituted or unsubstituted alkyl group having from 1 to 6 carbon atoms or a substituted or unsubstituted phenyl group having from 6 to 10 carbon atoms;

$Z^2$ is a hydrogen atom, a halogen atom, a nitro group, a cyano group or a trifluoromethyl group; and A is a hydroxyl group

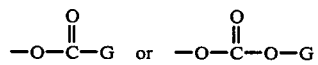

group, wherein G represents an alkyl group having from 1 to 18 carbon atoms, a halogen-substituted alkyl group having from 1 to 18 carbon atoms, a phenyl group, or a substituted phenyl group.

3. A silver halide photographic light-sensitive material as in claim 1, wherein $R^1$ is an alkyl group having from 1 to 3 carbon atoms; $R^2$ is —$NHSO_2R^{2'}$ wherein $R^{2'}$ is an alkyl group having from 1 to 3 carbon atoms or —$SO_2NHR^{2''}$ wherein $R^{2''}$ is a hydrogen atom or an alkyl group having from 1 to 3 carbon atoms; W is —$SO_2$—; X is

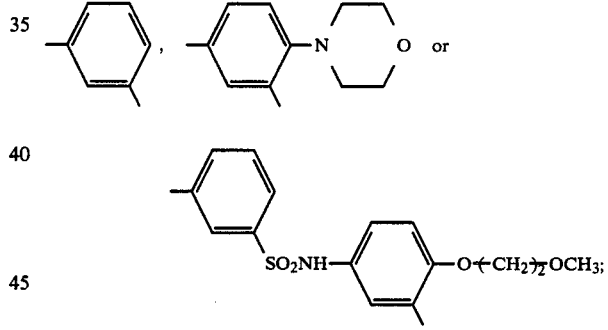

$Z^1$ is a halogen atom, a cyano atom, a nitro atom, —$SO_2NR^5R^6$ wherein $R^5$ and $R^6$, which is the same or different, each represents a hydrogen atom, or an alkyl group having from 1 to 3 carbon atoms, or an alkylsulfonyl group having from 1 to 3 carbon atoms; $Z^2$ is a hydrogen atom, a halogen atom, a nitro group, or a cyano group; the redox center represented by Y is an N-substituted sulfamoyl group; and A is a hydroxyl group.

4. A silver halide photographic light-sensitive material as in claim 3, wherein the N-substituent for the N-substituted sulfamoyl group is a carbon ring group or a heterocyclic group.

5. A silver halide photographic light-sensitive material as in claim 1, wherein the redox center represented by Y is an N-substituted sulfamoyl group.

6. A silver halide photographic light-sensitive material as in claim 5, wherein the N-substituent for the N-substituted sulfamoyl group is a carbon ring group or a heterocyclic group.

7. A silver halide photographic light-sensitive material as in claim 2, wherein the substituted arylene group for $R^3$ or $R^{3'}$ has from 6 to about 11 carbon atoms.

8. A silver halide photographic light-sensitive material as in claim 1, wherein Y is a group represented by formula (II)

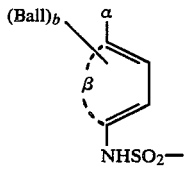
(II)

wherein
- $\beta$ represents a non-metallic atomic group forming a benzene ring, to which a carbon ring or a hetero ring may be fused;
- $\alpha$ represents a group of the formula —$OG^1$ or —$NHG^2$, wherein $G^1$ is a hydrogen atom or a group forming a hydroxyl group or hydrolysis, and $G^2$ is a hydrogen atom, an alkyl group having from 1 to 22 carbon atoms, or a hydrolyzable group;
- b is 0 or an integer of 1 or 2, wherein when $\alpha$ is a group of the formula —$OG^1$, or $\alpha$ is a group of the formula —$NHG^2$ and $G^2$ is a hydrogen atom, an alkyl group having from 1 to 8 carbon atoms, or a hydrolyzable group, b is 1 or 2 and;
- Ball represents a ballast group.

9. A silver halide photographic light-sensitive material as in claim 2, wherein Y is a group represented by formula (II)

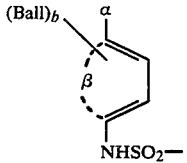
(II)

wherein
- $\beta$ represents a non-metallic atomic group forming a benzene ring, to which a carbon ring or a hetero ring may be fused;
- $\alpha$ represents a group of the formula —$OG^1$ or —$NHG^2$, wherein $G^1$ is a hydrogen atom or a group forming a hydroxyl group on hydrolysis, and $G^2$ is a hydrogen atom, an alkyl group having from 1 to 22 carbon atoms, or a hydrolyzable group;
- b is 0 or an integer of 1 or 2, wherein when $\alpha$ is a group of the formula —$OG^1$, or $\alpha$ is a group of the formula —$NHG^2$ and $G^2$ is a hydrogen atom, an alkyl group having from 1 to 8 carbon atoms, or a hydrolyzable group, b is 1 or 2 and;
- Ball represents a ballast group.

10. A silver halide photographic light-sensitive material as in claim 1, wherein Y is a group represented by formula (III)

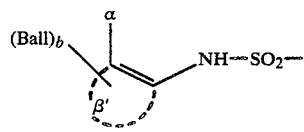
(III)

wherein
- $\beta'$ is an atomic group forming a carbon ring to which a carbon ring or a hetero ring may be fused;
- $\alpha$ represents a group of the formula —$OG^1$ or —$NHG^2$, wherein $G^1$ is a hydrogen atom or a group forming a hydroxyl group on hydrolysis, and $G^2$ is a hydrogen atom, an alkyl group having from 1 to 22 carbon atoms, or a hydrolyzable group;
- b is 0 or an integer of 1 or 2, wherein when $\alpha$ is a group of the formula —$OG^1$, or $\alpha$ is a group of the formula —$NHG^2$ and $G^2$ is a hydrogen atom, an alkyl group having from 1 to 8 carbon atoms, or a hydrolyzable group, b is 1 or 2; and
- Ball represents a ballast group.

11. A silver halide photographic light-sensitive material as in claim 2, wherein Y is a group represented by formula (III)

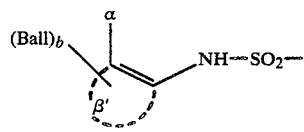
(III)

wherein
- $\beta'$ is an atomic group forming a carbon ring to which a carbon ring or a hetero ring may be fused;
- $\alpha$ represents a group of the formula —$OG^1$ or —$NHG^2$, wherein $G^1$ is a hydrogen atom or a group forming a hydroxyl group on hydrolysis, and $G^2$ is a hydrogen atom, an alkyl group having from 1 to 22 carbon atoms, or a hydrolyzable group;
- b is 0 or an integer of 1 or 2, wherein when $\alpha$ is a group of the formula —$OG^1$, or $\alpha$ is a group of the formula —$NHG^2$ and $G^2$ is a hydrogen atom, an alkyl group having from 1 to 8 carbon atoms, or a hydrolyzable group, b is 1 or 2 and;
- Ball represents a ballast group.

12. A silver halide photographic light-sensitive material as in claim 1, wherein Y is a group represented by formula (IV)

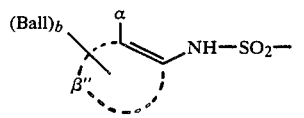
(IV)

wherein
- $\beta''$ represents an atomic group forming a hetero ring;
- $\alpha$ represents a group of the formula —$OG^1$ or —$NHG^2$, wherein $G^1$ is a hydrogen atom or a group forming a hydroxyl group on hydrolysis, and $G^2$ is a hydrogen atom, an alkyl group having from 1 to 22 carbon atoms, or a hydrolyzable group;

b is 0 or an integer of 1 or 2, wherein when α is a group of the formula —OG$^1$, or α is a group of the formula —NHG$^2$ and G$^2$ is a hydrogen atom, an alkyl group having from 1 to 8 carbon atoms, or a hydrolyzable group, b is 1 or 2; and Ball represents a ballast group.

13. A silver halide photographic light-sensitive material as in claim 2, wherein Y is a group represented by formula (IV)

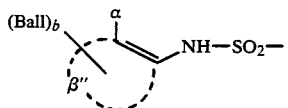

wherein

β" represents an atomic group forming a hetero ring;
α represents a group of the formula —OG$^1$ or —NHG$^2$, wherein G$^1$ is a hydrogen atom or a group forming a hydroxyl group on hydrolysis, and G$^2$ is a hydrogen atom, an alkyl group having from 1 to 22 carbon atoms, or a hydrolyzable group;
b is 0 or an integer of 1 or 2, wherein when α is a group of the formula —OG$^1$, or α is a group of the formula —NHG$^2$ and G$^2$ is a hydrogen atom, an alkyl group having from 1 to 8 carbon atoms, or a hydrolyzable group, b is 1 or 2; and Ball represents a ballast group.

14. A silver halide photographic light-sensitive material as in claim 1, wherein Y is a group represented by formula (V)

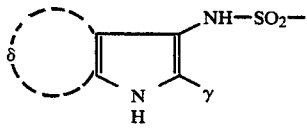

wherein

γ is a hydrogen atom, a substituted or unsubstituted alkyl group, a substituted or unsubstituted aryl group, a substituted or unsubstituted heterocyclic group, or —CO—G$^6$ wherein G$^6$ represents —OG$^7$, —S—G$^7$ or

wherein G$^7$ is a hydrogen atom, an alkyl group, a cycloalkyl group, or an aryl group, which may be substituted, G$^8$ is selected from the same group as defined for G$^7$, or an acyl group derived from an aliphatic or aromatic carboxylic acid or sulfonic acid, and G$^9$ is a hydrogen atom or a substituted or unsubstituted alkyl group and;

δ is an atomic group forming a condensed benzene ring which may be substituted.

15. A silver halide photographic light-sensitive material as in claim 2, wherein Y is a group represented by formula (V)

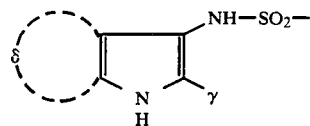

wherein

γ is a hydrogen atom, a substituted or unsubstituted alkyl group, a substituted or unsubstituted aryl group, a substituted or unsubstituted heterocyclic group, or —CO—G$^6$ wherein G$^6$ represents —OG$^7$, —S—G$^7$ or

wherein G$^7$ is a hydrogen atom, an alkyl group, a cycloalkyl group, or an aryl group, which may be substituted, G$^8$ is selected from the same group as defined for G$^7$, or an acyl group derived from an aliphatic or aromatic carboxylic acid or sulfonic acid, and G$^9$ is a hydrogen atom or a substituted or unsubstituted alkyl group and;

δ is an atomic group forming a condensed benzene ring which may be substituted.

16. A silver halide photographic light-sensitive material as in claim 1, wherein the compound of formula (I) is incorporated in an amount of from about $1 \times 10^{-4}$ to $1 \times 10^{-2}$ mol/m$^2$.

17. A silver halide photographic light-sensitive material as in claim 1, wherein the compound of formula (I) is incorporated in an amount of from about $2 \times 10^{-4}$ to $2 \times 10^{-3}$ mol/m$^2$.

18. A silver halide photographic light-sensitive material as in claim 2, wherein the compound of formula (I) is incorporated in an amount of from about $1 \times 10^{-4}$ to $1 \times 10^{-2}$ mol/m$^2$.

19. A silver halide photographic light-sensitive material as in claim 2, wherein the compound of formula (I) is incorporated in an amount of from about $2 \times 10^{-4}$ to $2 \times 10^{-3}$ mol/m$^2$.

20. A silver halide photographic light-sensitive material as in claim 1, wherein Y is a redox center capable of releasing a diffusible dye under alkaline conditions, but does not substantially cause the dye release when directly or indirectly reacted with an oxidized developer.

21. A silver halide photographic light-sensitive material as in claim 1, wherein Y is a redox center capable of releasing a diffusible dye by reduction.

22. A silver halide photographic light-sensitive material as in claim 1, comprising a support having thereon at least a silver halide emulsion layer associated therewith the compound of formula (I).

* * * * *